(12) United States Patent
Harper et al.

(10) Patent No.: US 7,686,606 B2
(45) Date of Patent: Mar. 30, 2010

(54) IMPRINT EMBOSSING ALIGNMENT SYSTEM

(75) Inventors: Bruce M. Harper, San Jose, CA (US); Toshiyuki Max Saito, Saratoga, CA (US)

(73) Assignee: WD Media, Inc., San Jose, CA (US)

( * ) Notice: Subject to any disclaimer, the term of this patent is extended or adjusted under 35 U.S.C. 154(b) by 1822 days.

(21) Appl. No.: 10/761,464

(22) Filed: Jan. 20, 2004

(65) Prior Publication Data

US 2005/0158163 A1 Jul. 21, 2005

(51) Int. Cl.
*B29C 59/02* (2006.01)
(52) U.S. Cl. ............ 425/385; 264/1.33; 264/106; 425/400; 425/406; 425/810
(58) Field of Classification Search ........... 425/406, 425/411, 810, 385, 398, 400; 264/1.33, 106, 264/107
See application file for complete search history.

(56) References Cited

U.S. PATENT DOCUMENTS

| | | | |
|---|---|---|---|
| 3,946,634 A * | 3/1976 | Allen et al. ............ 83/819 |
| 4,062,600 A | 12/1977 | Wyse | |
| 4,343,025 A | 8/1982 | Kronfeld et al. | |
| 4,571,320 A | 2/1986 | Walker | |
| 4,694,703 A | 9/1987 | Routson | |
| 4,770,739 A | 9/1988 | Orvek et al. | |
| 4,778,372 A | 10/1988 | Mutti et al. | |
| 4,786,564 A | 11/1988 | Chen et al. | |
| 4,931,351 A | 6/1990 | McColgin et al. | |
| 5,018,037 A | 5/1991 | Krounbi et al. | |
| 5,045,150 A | 9/1991 | Cleeves et al. | |
| 5,045,165 A | 9/1991 | Yamashssita | |
| 5,077,888 A | 1/1992 | Tokisue et al. | |
| 5,080,549 A | 1/1992 | Goodwin et al. | |
| 5,091,047 A | 2/1992 | Cleeves et al. | |
| 5,219,788 A | 6/1993 | Abernathey et al. | |
| 5,259,926 A | 11/1993 | Kuwabara et al. | |
| 5,290,397 A | 3/1994 | Ober et al. | |
| 5,293,287 A | 3/1994 | Tzur et al. | |
| 5,295,802 A | 3/1994 | Hersbt | |
| 5,318,877 A | 6/1994 | Ober et al. | |
| 5,320,934 A | 6/1994 | Misium et al. | |

(Continued)

FOREIGN PATENT DOCUMENTS

WO 98/01890 A1 1/1998

(Continued)

OTHER PUBLICATIONS

Brian Faircloth et al. "Bilayer, nanoimprint lithography", J. Vac. Sci. Technol.B 18(4), Jul./Aug. 2000, 2000 American Vacuum Society, pp. 1-8.

(Continued)

*Primary Examiner*—Mathieu D. Vargot

(57) ABSTRACT

An imprint embossing alignment system. In one embodiment, the system includes a die having a bottom surface, an embossing foil positioned above the bottom surface, and a mandrel, to receive the substrate, having a rod portion that extends through a central portion of the die. The system also includes a ball bushing positioned around the rod portion and a ring portion positioned between the ball bushing and the embossing foil to hold a precise alignment of a centerline of the rod portion and a centerline of the embossing foil.

11 Claims, 25 Drawing Sheets

U.S. PATENT DOCUMENTS

| | | |
|---|---|---|
| 5,322,987 A | 6/1994 | Thomas et al. |
| 5,413,018 A | 5/1995 | Wada et al. |
| 5,427,599 A | 6/1995 | Greschner et al. |
| 5,455,145 A | 10/1995 | Tarumoto |
| 5,493,959 A | 2/1996 | Yagi et al. |
| 5,512,131 A | 4/1996 | Kumar et al. |
| 5,537,282 A | 7/1996 | Treves et al. |
| 5,571,473 A | 11/1996 | Fujii |
| 5,681,638 A | 10/1997 | Korenaga |
| 5,738,008 A | 4/1998 | Freund |
| 5,772,905 A | 6/1998 | Chou |
| 5,820,769 A | 10/1998 | Chou |
| 5,888,433 A | 3/1999 | Amo |
| 5,894,056 A | 4/1999 | Kakizaki et al. |
| 5,915,915 A | 6/1999 | Allen et al. |
| 5,956,216 A | 9/1999 | Chou |
| 5,985,524 A | 11/1999 | Allen et al. |
| 6,019,930 A | 2/2000 | Baresich |
| 6,086,730 A | 7/2000 | Liu et al. |
| 6,150,015 A | 11/2000 | Bertero et al. |
| 6,210,855 B1 | 4/2001 | Ueda et al. |
| 6,218,056 B1 | 4/2001 | Pinarbasi et al. |
| 6,242,718 B1 | 6/2001 | Ferro et al. |
| 6,257,866 B1 | 7/2001 | Fritz et al. |
| 6,276,656 B1 | 8/2001 | Baresich |
| 6,281,679 B1 | 8/2001 | King et al. |
| 6,309,580 B1 | 10/2001 | Chou |
| RE37,470 E | 12/2001 | Ohkura et al. |
| 6,381,090 B1 | 4/2002 | Suzuki et al. |
| 6,383,944 B1 | 5/2002 | Furihata et al. |
| 6,440,646 B2 | 8/2002 | Ueda et al. |
| 6,482,279 B2 | 11/2002 | Nakano et al. |
| 6,482,742 B1 | 11/2002 | Chou |
| 6,518,189 B1 | 2/2003 | Chou |
| 6,696,220 B2 | 2/2004 | Bailey et al. |
| 6,705,853 B1 | 3/2004 | Nehring |
| 6,757,116 B1 | 6/2004 | Curtiss et al. |
| 6,793,476 B2 | 9/2004 | Bryja et al. |
| 6,869,557 B1 | 3/2005 | Wago et al. |
| 6,939,120 B1 | 9/2005 | Harper |
| 6,951,173 B1 | 10/2005 | Meissl et al. |
| 6,989,114 B1 | 1/2006 | Korenaga et al. |
| 6,994,541 B2 | 2/2006 | Chung et al. |
| 7,044,726 B2 | 5/2006 | Koyama et al. |
| 7,082,876 B2 | 8/2006 | Olsson |
| 7,144,539 B2 | 12/2006 | Olsson |
| 7,162,810 B2 | 1/2007 | Biggs et al. |
| 7,186,109 B2 | 3/2007 | Koyama et al. |
| 7,204,686 B2 | 4/2007 | Chung et al. |
| 7,229,266 B2 | 6/2007 | Harper |
| 7,252,492 B2 | 8/2007 | Olsson et al. |
| 7,281,920 B2 | 10/2007 | Homola et al. |
| 7,322,287 B2 | 1/2008 | Tan et al. |
| 7,363,854 B2 | 4/2008 | Sewell |
| 2002/0025408 A1 | 2/2002 | Davis |
| 2002/0042027 A1 | 4/2002 | Chou et al. |
| 2002/0071214 A1 | 6/2002 | Belser |
| 2002/0098426 A1 | 7/2002 | Sreenivasan et al. |
| 2002/0132482 A1 | 9/2002 | Chou |
| 2002/0135939 A1 | 9/2002 | Wada |
| 2002/0136927 A1 | 9/2002 | Hieda et al. |
| 2002/0167117 A1 | 11/2002 | Chou |
| 2002/0177319 A1 | 11/2002 | Chou |
| 2003/0030188 A1 | 2/2003 | Spengler |
| 2003/0034329 A1 | 2/2003 | Chou |
| 2003/0071016 A1 | 4/2003 | Shih et al. |
| 2003/0080471 A1 | 5/2003 | Chou |
| 2003/0080472 A1 | 5/2003 | Chou |
| 2003/0170995 A1 | 9/2003 | Chou |
| 2003/0170996 A1 | 9/2003 | Chou |
| 2004/0053146 A1 | 3/2004 | Sreenivasan et al. |
| 2004/0132301 A1 | 7/2004 | Harper et al. |
| 2004/0238972 A1 | 12/2004 | Ho et al. |
| 2005/0146078 A1 | 7/2005 | Chou et al. |
| 2005/0150862 A1 | 7/2005 | Harper et al. |
| 2005/0151300 A1 | 7/2005 | Harper et al. |
| 2005/0155554 A1 | 7/2005 | Saito |
| 2005/0156342 A1 | 7/2005 | Harper et al. |
| 2005/0158163 A1 | 7/2005 | Harper et al. |
| 2005/0172848 A1 | 8/2005 | Olsson |
| 2005/0236738 A1 | 10/2005 | Harper |
| 2007/0062396 A1 | 3/2007 | Takai et al. |
| 2007/0134362 A1 | 6/2007 | Heidari |
| 2007/0166651 A1 | 7/2007 | Fujita et al. |
| 2007/0211592 A1 | 9/2007 | Sakurai et al. |
| 2008/0093760 A1 | 4/2008 | Harper et al. |
| 2008/0223237 A1 | 9/2008 | Ando et al. |

FOREIGN PATENT DOCUMENTS

| | | |
|---|---|---|
| WO | 00/50321 A1 | 8/2000 |
| WO | WO 00/48172 | 8/2000 |
| WO | 0142858 A1 | 6/2001 |

OTHER PUBLICATIONS

Matsui, S. et al., "Room Temperature Replication in Spin on Glass by Nanoimprint Technology", J. Vac. Sci. Technol. B, vol. 19, No. 6, Nov./Dec. 2001, pp. 2801-2805.

Wu et al., "Large Area High Density Quantized Magnetic Disks Fabricated Using Nanoimprint Lithography", J. Vac. Sci. Technol. B vol. 16, No. 6, Nov./Dec. 1998, pp. 3825-3829.

Office Action dated May 16, 2006 from U.S. Appl. No. 10/761,486, 12 pages.

Office Action dated Feb. 8, 2007 from U.S. Appl. No. 10/761,486, 13 pages.

Office Action dated Sep. 24, 2007 from U.S. Appl. No. 10/761,486, 8 pages.

Notice of Allowance dated Oct. 25, 2007 from U.S. Appl. No. 10/761,486, 7 pages.

\* cited by examiner

IMPRINT EMBOSSING ALIGNMENT SYSTEM

TECHNICAL FIELD

Embodiments of this invention relate to the field of disk drives and, more specifically, to disks used in disk drive systems.

BACKGROUND

A disk drive system includes one or more magnetic recording disks and control mechanisms for storing data within approximately circular tracks on the disk. A disk is composed of a substrate and one or more layers deposited on the substrate (e.g., aluminum). A trend in the design of disk drive systems is to increase the recording density of the magnetic recording disk used in the system. One method for increasing recording density is to pattern the surface of the disk with discrete tracks, referred to as discrete track recording (DTR). A DTR pattern may be formed by nano-imprint lithography (NIL) techniques, in which a rigid, pre-embossed forming tool (a.k.a., stamper, embosser, etc.), having an inverse pattern to be imprinted, is pressed into an embossable film (i.e., polymer) disposed above a disk substrate to form an initial pattern of compressed areas. This initial pattern ultimately forms a pattern of raised and recessed areas. After stamping the embossable film, an etching process is used to transfer the pattern through the embossable film by removing the residual film in the compressed areas. After the imprint lithography process, another etching process may be used to form the pattern in a layer (e.g., substrate, nickel-phosphorous, soft magnetic layer, etc.) residing underneath the embossable film.

One prior DTR structure forms a pattern of concentric raised areas and recessed areas under a magnetic recording layer. The raised areas (also known as hills, lands, elevations, etc.) are used for storing data and the recessed areas (also known as troughs, valleys, grooves, etc.) provide inter-track isolation to reduce noise. The raised areas have a width less than the width of the recording head such that portions of the head extend over the recessed areas during operation. The recessed areas have a depth relative to fly height of a recording head and raised areas. The recessed areas are sufficiently distanced from the head to inhibit storage of data by the head in the magnetic layer directly below the recessed areas. The raised areas are sufficiently close to the head to enable the writing of data in the magnetic layer directly on the raised areas. Therefore, when data are written to the recoding medium, the raised areas correspond to the data tracks. The recessed areas isolate the raised areas (e.g., the data tracks) from one another, resulting in data tracks that are defined both physically and magnetically.

A DTR disk may not be viable if the imprinting surface is not concentrically aligned with the disk substrate. An imprinted track that has excessive offset from a centerline of the disk may not operate properly when read by a disk drive head. This requirement may be particularly important when data tracks are generated on both sides of the disk. As such, the imprinting of an embossable film above a disk substrate requires an alignment step, in which a centerline of the disk is aligned with a centerline of the imprinting surface, before the embossable film is actually imprinted.

Current alignment methods typically require the use of high precision actuators or robotics. For example, high precision actuators would first determine a centerline for the disk substrate and align it with a centerline of the imprinting surface through a high resolution X-Y translation procedure. FIG. 1 illustrates a conventional X-Y translation stage that includes flexures for gripping a disk. Flexures are widely used in precision machines because they may provide frictionless, particle-free and low maintenance operation, while providing high precision. However, flexure based systems have limited ranges of motion and may not be adequate to center a disk relative to the imprinting surface of a stamper. The translation stage allows heat to dissipate from the surface of the disk that may result in inconsistent imprint patterns. Moreover, the use of such high precision actuators and robotics are expensive, with high maintenance costs, inconsistent accuracy and reliability, slow cycle times, and mechanical breakdown. The high precision actuators and robotics are bulky pieces of machinery, requiring large amounts of floor space.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

The terms "above," "below," and "between" as used herein refer to a relative position of one layer or component with respect to other layers or components. As such, a first layer or component disposed above or below another layer or component may be directly in contact with the first layer or component or may have one or more intervening layers or components. Moreover, one layer or component disposed next to or adjacent another layer or component may be directly in contact with the first layer or component or may have one or more intervening layers or components.

It should be noted that the apparatus and methods discussed herein may be used with various types of substrates (e.g., disk substrates and wafer substrates). In one embodiment, the apparatus and methods discussed herein may be used for the imprinting of embossable materials for the production of magnetic recording disks. The magnetic recording disk may be, for example, a DTR longitudinal magnetic recording disk having, for example, a nickel-phosphorous (NiP) plated substrate as a base structure. Alternatively, the magnetic recording disk may be a DTR perpendicular magnetic recording disk having a soft magnetic film disposed above a substrate for the base structure. In an alternative embodiment, the apparatus and methods discussed herein may be used for the imprinting of embossable materials for the production of other types of digital recording disks, for examples, optical recording disks such as a compact disc (CD) and a digital-versatile-disk (DVD). In yet other embodiments, the apparatus and methods discussed herein may be used in other applications, for examples, the production of semiconductor wafers, display panels (e.g., liquid crystal display panels), etc.

Figure 1:
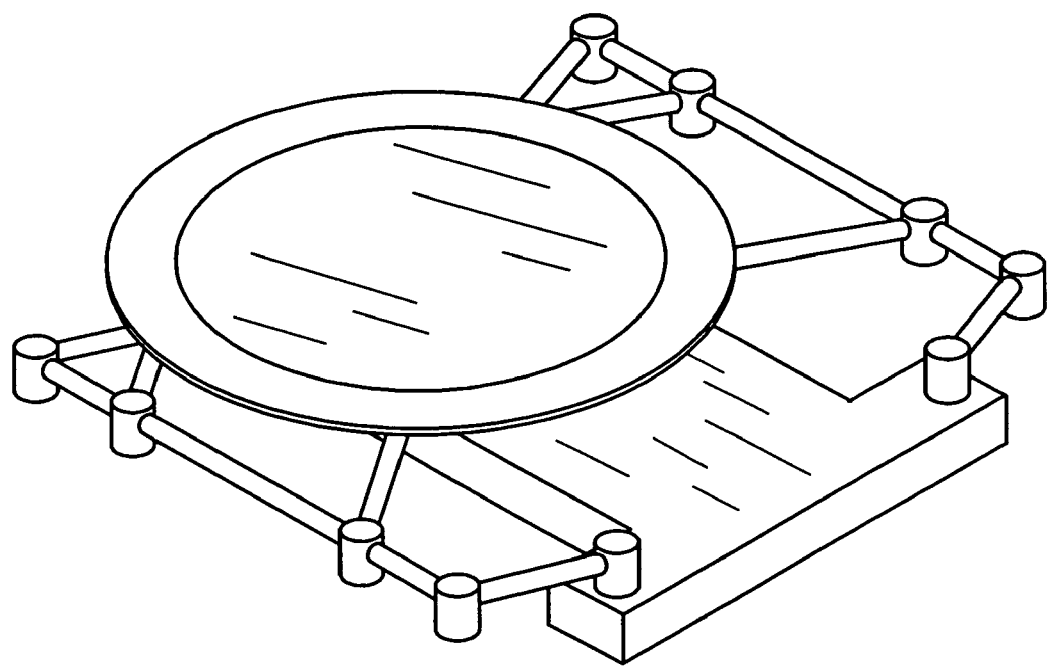
FIG. 1 illustrates a conventional X-Y translation stage that includes flexures for gripping a substrate.
Figure 2:
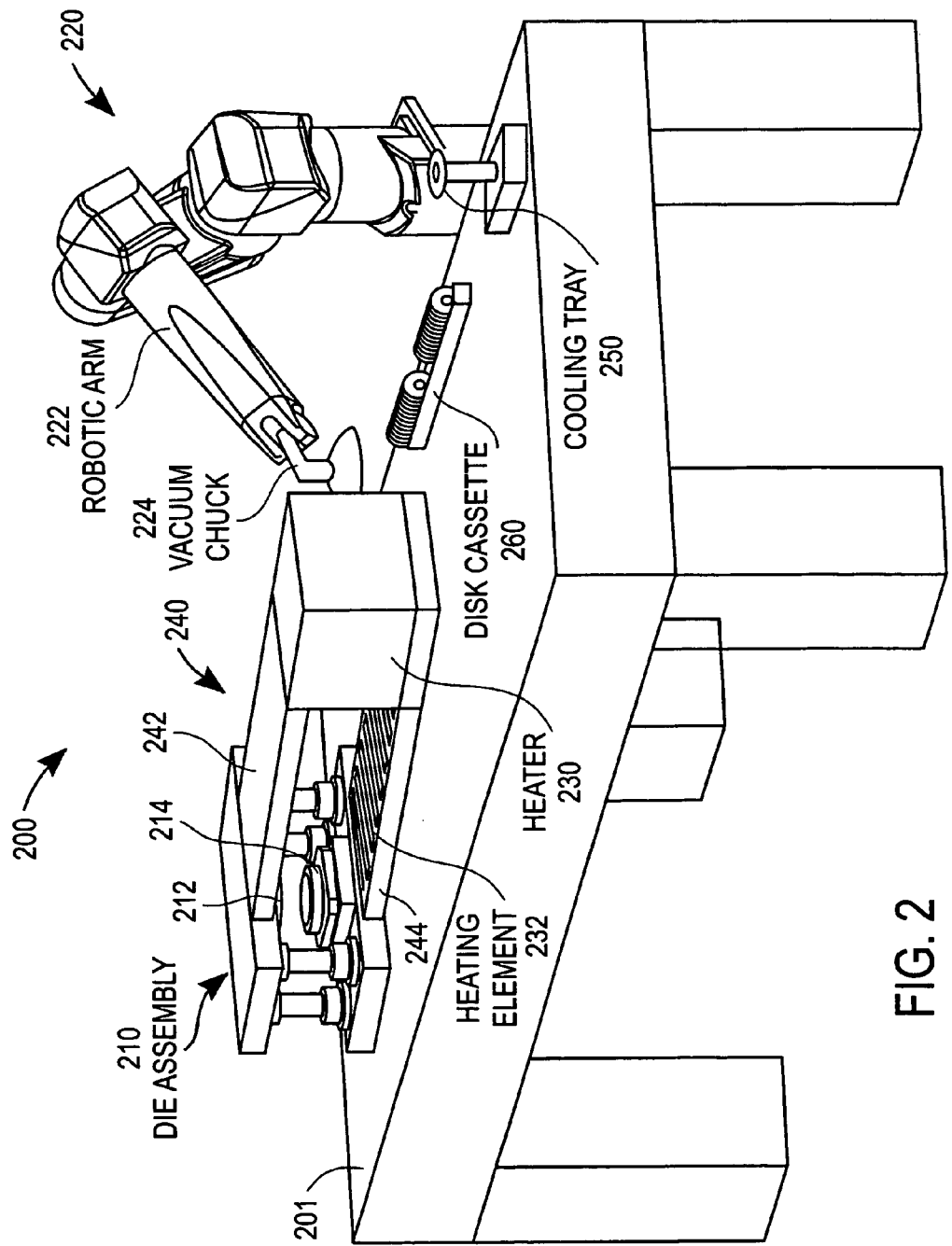
FIG. 2 illustrates one embodiment an imprinting system.

Apparatus and methods for the imprinting an embossable film disposed above a substrate are described. By way of example only, embodiments of an imprint embossing system are described with respect to a disk substrate. However, it may be appreciated by one of skill in the art that embodiments of an imprint embossing system may be easily adapted for substrates that vary in shape and size (e.g., square, rectangular), for the production of different types of substrates discussed above. Embodiments of an imprinting system described herein may be used for imprinting embossable films with nano-imprint lithography techniques. Alternatively, other scale imprint lithography techniques may be used, such as micro-imprint lithography. FIG. 2 illustrates one embodiment of an imprinting system 200 that includes imprint or die assembly 210, heater 230, heat tunnel 240, disk substrate cooling tray 250, and disk cassette 260 mounted to table 201. Assembly 200 also includes a disk substrate transporting device 220 disposed next to table 201. In one embodiment, transporting device 220 may be a vacuum chuck coupled to a robotic arm that extends over table 201. Imprint assembly 210 includes upper die assembly 212 and lower die assembly 214 that may include one or more embossing foils (a.k.a., stamper) that press into an embossable film disposed above a disk substrate to transfer a pattern into the embossable film. Heater 230 having heating element 232 may be used to pre-heat the embossable film on the disk substrate to a desired embossing temperature. Heating element 232 may also extend along a length of top and bottom portions 242, 244 that form heat tunnel 240. In one embodiment, heater 230 and heating element 232 may have separate heating sources. In an alternative embodiment, heater 230 and heating element 232 may share the same heating source. In one embodiment, heating element 232 may be heat coils utilizing inductive heating to maintain the temperature of the embossable film. In alternative embodiments, heat element 232 may be another type of element, for example, an infrared (IR) heat source. In one embodiment, a heat tunnel connects heater 230 with die assembly 210 in order to maintain the desired embossing temperature during transport of the disk substrate from heater 230 to die assembly 210.

In one method for imprinting the embossable film on disk substrates, transporting device 220 picks up a disk substrate from cassette 260 using vacuum chuck 224. Vacuum chucks for handling disk substrates are known in the art; accordingly, a detailed description is not provided herein. In alternative embodiments, other pick and place devices known in the art may be used to remove a disk substrate from cassette 260. A disk substrate may be pre-heated to bring up the temperature of the embossable film on the disk substrate to an optimum embossing level. To do so, in one embodiment, vacuum chuck 224 places a disk substrate within heater 230. In one embodiment, the embossable film on the disk substrate may be heated to a temperature in the range of approximately 20 to 350 degrees C. After the embossable film on the disk substrate is heated to a desired embossing temperature, the vacuum chuck 224 moves the disk substrate through heat tunnel 240 towards die assembly 210. The disk substrate is then centered relative to the top and/or bottom embossing foils and then pressed against the embossable film of the disk substrate to form an embossing pattern (e.g., DTR pattern). After the embossable film is imprinted, vacuum chuck 224 transports the disk substrate to cooling tray 250 before returning it to cassette 260.

The use of heat tunnel 240 minimizes thermal dissipation of the heated embossable film of the disk substrate. Thermal dissipation may lead to inconsistencies in the embossable film and subsequent inconsistencies in the embossed pattern. As discussed above, heat tunnel 240 maintains the approximate embossing temperature of the heated embossable film until the disk substrate is placed in the die assembly. Although the embossing foils in die assembly 210 may be heated, a heated embossable film may result in a quicker and more efficient imprint. Moreover, by positioning heater 230 relatively close to die assembly 210, thermal distortion of the embossable film is minimized.

Figure 3:
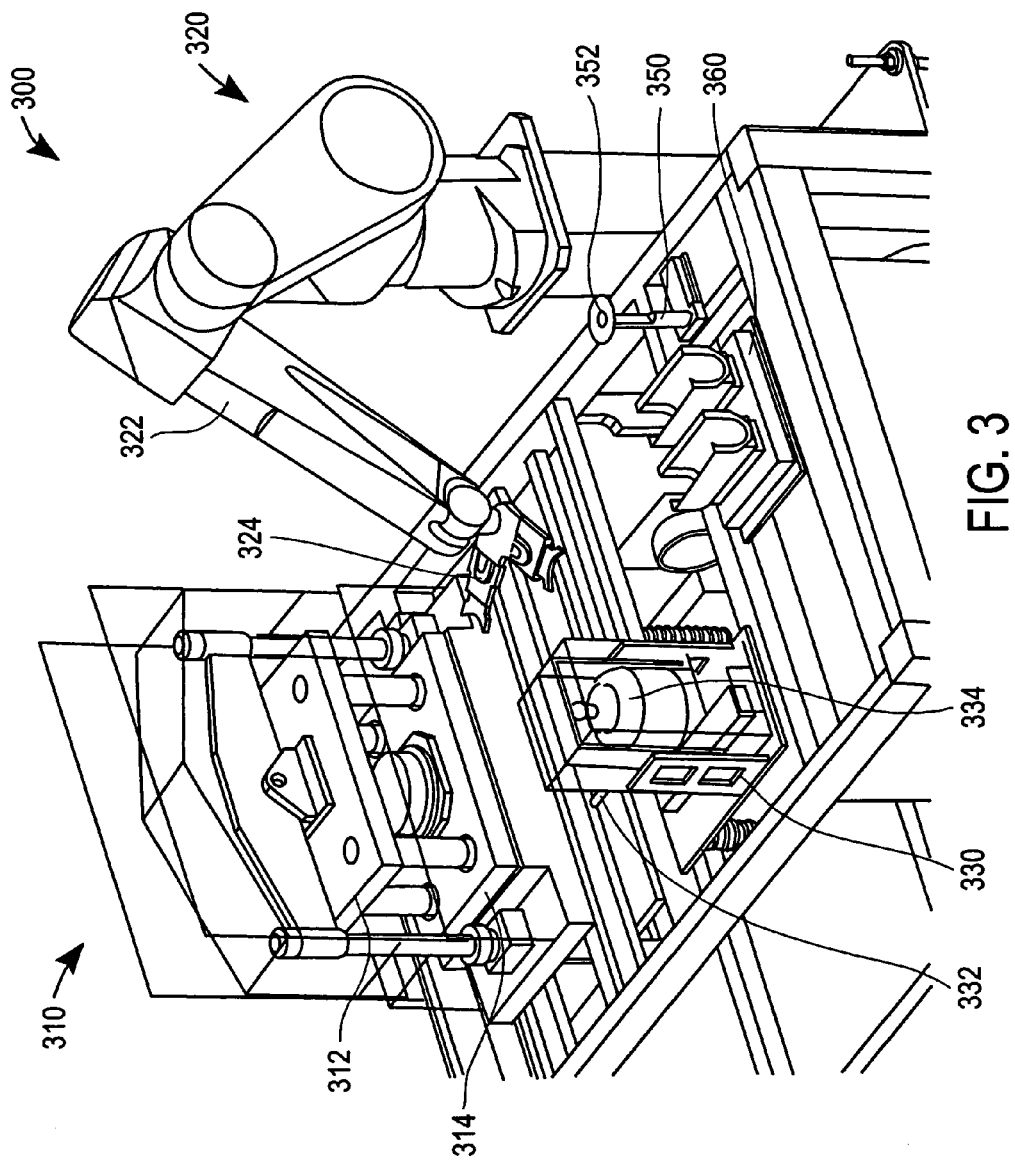
FIG. 3 illustrates an alternative embodiment of an imprinting system.

FIG. 3 illustrates another embodiment of an imprinting system 300 having a heater 330 disposed near die assembly 310 that does not include a heat tunnel as shown above with respect to FIG. 2. The close proximity of heater 330 to die assembly 310 may not require a heat tunnel to maintain the temperature of the embossable film/disk substrate that is sufficiently close to the desired embossing temperature. Vacuum chuck 324, coupled to robotic arm 322 of transporting device 320, moves a disk substrate around imprinting system 300. For example, in one embodiment, a disk substrate may be transported from cassette 360 to heater 330 to be pre-heated to a temperature below, substantially at, or above the desired embossing temperature. The preheated embossable film/disk substrate is positioned in close proximity (e.g., nest area of lower die assembly 314) to the die assembly 310. Alternatively, the embossable film/disk substrate may be preheated to a temperature below that of (e.g., close to) the embossing temperature and then heated to the embossing temperature during or after its positioning close to die assembly 310. Alternatively, embossable film/disk substrate may be preheated to the die assembly's temperature/embossing temperature and imprinted after its close positioning to die assembly 310. Die assembly 310 may include one or more embossing foils for imprinting the embossable film disposed above a disk substrate transported from cassette 360. An embossing foil is then pressed into the embossable film at the embossing temperature. The embossing foil is then separated from embossable film after imprinting. Then, the disk substrate may be transported to die assembly 310 to be embossed followed by a period at cooling station 350.

Heater 330 of FIG. 3 is illustrated in a partially see-through view to show some of its internal components. A heat lamp 334 is disposed near a top portion of heater 330 to serve as the heat source. An ejecting tray 332 is disposed below heat lamp 334 to receive a disk substrate. Ejecting tray 332 slides out from heater 330 to receive a disk substrate from vacuum chuck 324 and slides back in under heat lamp 334. Tray 332, in one embodiment, may also have a spinning mechanism that spins a disk substrate while heating the embossable film. Cooling station 350 includes a receiving tray 352 for a disk substrate to rest on after being imprinted in die assembly 310.

Figure 4:
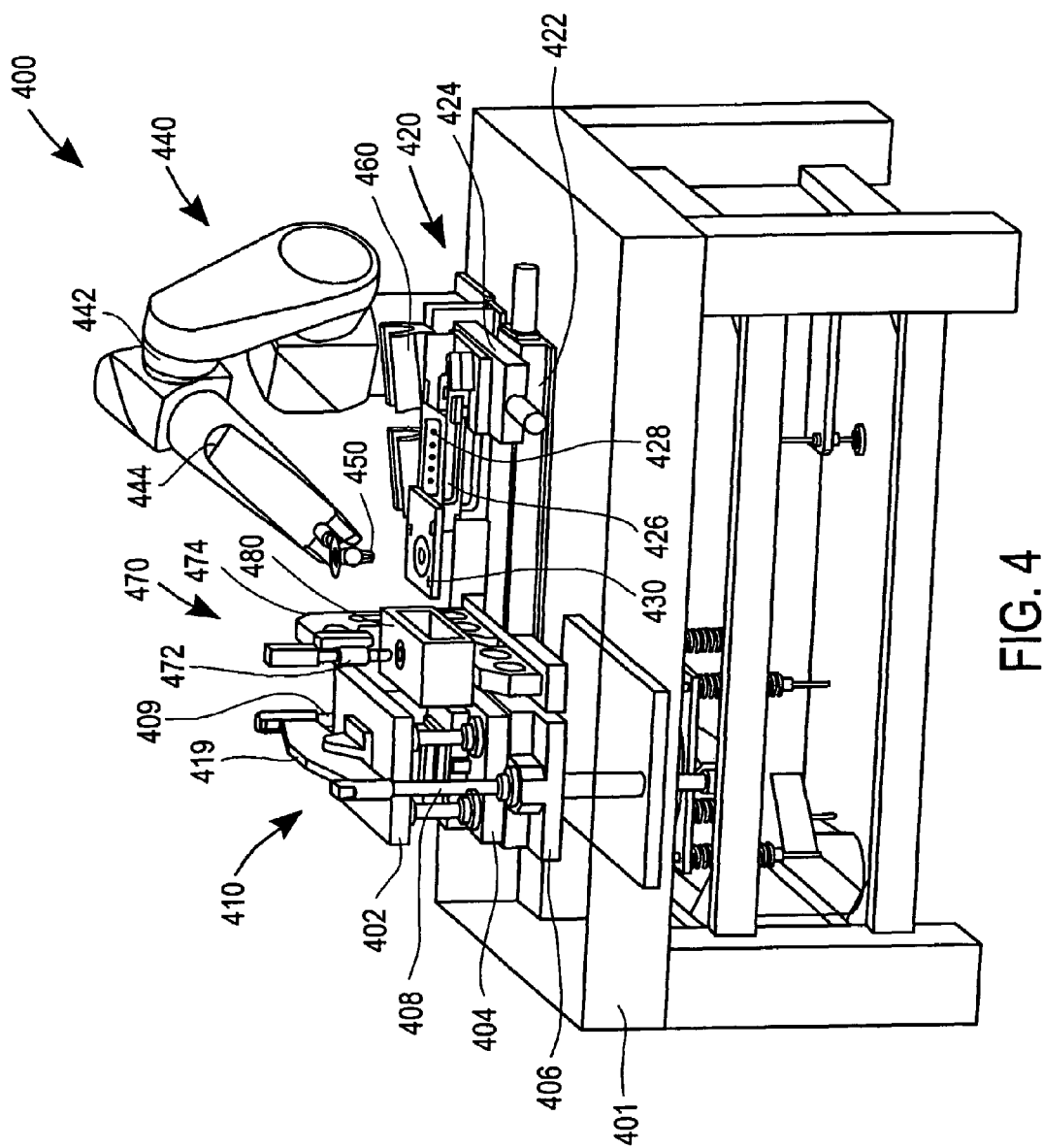
FIG. 4 illustrates another embodiment of an imprinting system.

FIG. 4 illustrates an alternative embodiment of an imprinting system 400 that includes imprint or die assembly 410, disk substrate transport device in the form of an infeed/outfeed assembly 420, visual assembly 470, and heater assembly 480 mounted to table 401. Assembly 400 also includes a robotic arm assembly 440 positioned next to table 401. Imprint assembly 410 includes upper die assembly 402 and lower die assembly 404. The upper and lower die assemblies are disposed above press baseplate 406. Draw bars 408 and 409 couple the upper and lower die assemblies 402, 404 and extend through table 401. Imprint assembly 410 also includes embossing die foils coupled to adjustable die holders (not shown). The die holders are fixed to a high precision, rolling element bushing die set. The die set is controlled by a stout framework, which accommodates a large diameter, low-pressure, high forced sealed bladder (not shown, but disposed below table 401). Upon application of gas (e.g., air) pressure to the bladder, it expands against a thrust plate, which causes draw bars 408, 409 to pull down on overhead yolk or cross beam 419. Cross beam 419 moves a top plate of the die set down to compress the dies together. In one embodiment, infeed/outfeed assembly 420 may be a servo slide having a tray portion 430 that receives a disk substrate from robotic arm assembly 440 and slides the disk substrate through heater 480 and into die assembly 410.

In one method for imprinting the embossable film disposed on disk substrates, robotic arm assembly 440 transports a disk substrate from cassette 460 and places it on a servo slide tray 430 of infeed/outfeed assembly 420. Robotic arm assembly 440 includes link arm 442 coupled to one end of upper arm 444 to allow for full rotational movement around table 401. Assembly 400 has the ability to impart thermal qualities to the handling of disk substrates. The embossable film disposed above a disk substrate may be pre-heated to bring up the temperature of the embossable film on the disk substrate to an optimum embossing level. Servo slide tray 430 may be positioned within heater assembly 480 to heat the embossable film to an optimum embossing temperature. In one embodiment, the embossable film disposed above a disk substrate may be heated to a temperature in the range of approximately 20 to 350 degrees C.

After the embossable film is heated, disk infeed/outfeed assembly 420 continues to move the disk substrate between top die 402 and bottom die 404 of die assembly 410. The disk substrate is then centered relative to the top and bottom embossing foils which are pressed into the embossable film to form an embossing pattern (e.g., DTR pattern). After the embossable film is embossed, infeed/outfeed assembly 420 may retract the disk substrate back into heater assembly 480 for inspection with visual assembly 470.

In one embodiment, an inspection step may be used to ensure that the embossed pattern is centered on the disk substrate. The visual assembly 470 inspects target track features on the imprinted embossable film to determine if its features are concentric with a center hole. This inspection routine may be done on a real-time or sampling basis. The use of heater assembly 480 provides the advantage of pre-heating the embossable film disposed on the disk substrate to an embossing temperature. Although the embossing foils in die assembly 410 may be heated, a heated embossable film/disk substrate may result in quicker and more efficient imprint. Moreover, thermal distortion of the disk substrate is minimized by positioning heater assembly 480 relatively close to die assembly 410.

Figure 4A:
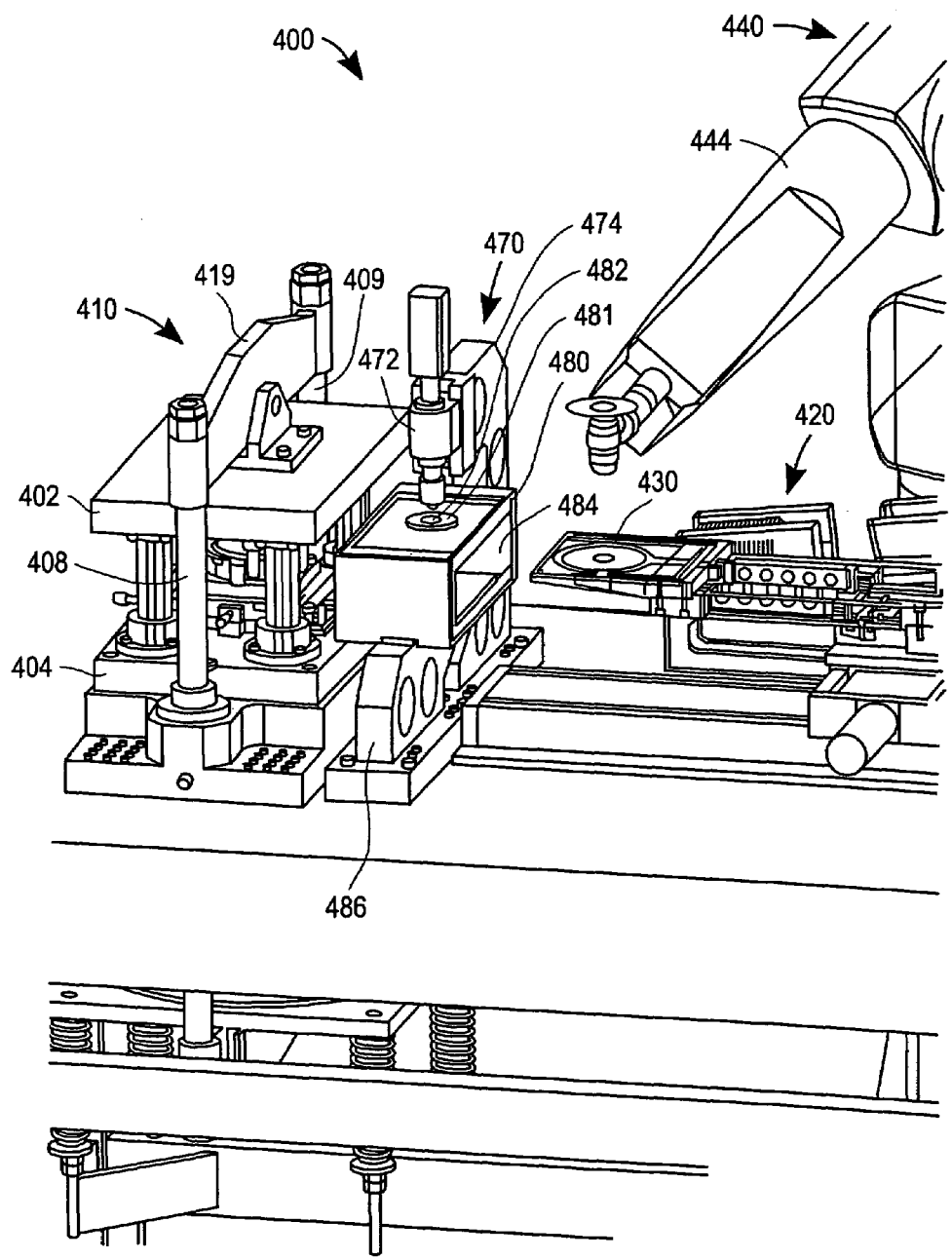
FIG. 4A illustrates an enlarged view of a heater assembly that is part of the imprinting system of FIG. 4.

FIG. 4A illustrates an enlarged view of die assembly 410, visual assembly 470, and heater assembly 480 of assembly 400. In one embodiment, heater assembly 480 includes a stand 486 that positions a heater box portion 481 at a height level with die assembly 410 and between top die 402 and bottom die 404. Box portion 481 includes an opening 484 to receive servo slide tray 430, and well as an opening 482 near a top surface to allow a line of sight for microscope 472 of visual assembly 470. In one embodiment, opening 482 may be covered with transparent glass. Bracket 474 allows microscope 472 to be positioned above box portion 481.

Figure 5A:
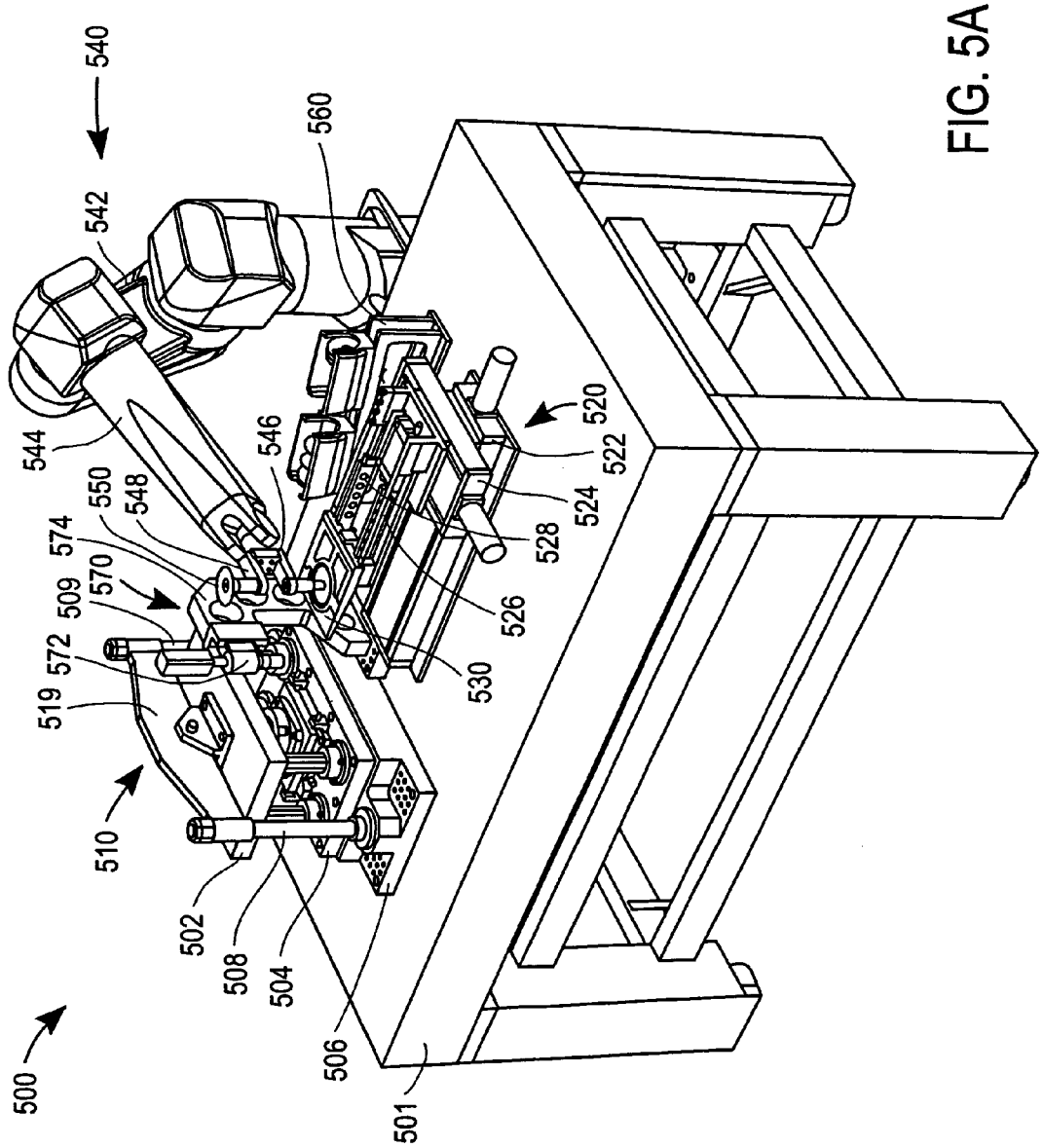
FIGS. 5A-5B show alternate views of a disk substrate transporting device that is part an imprinting system.
Figure 5B:
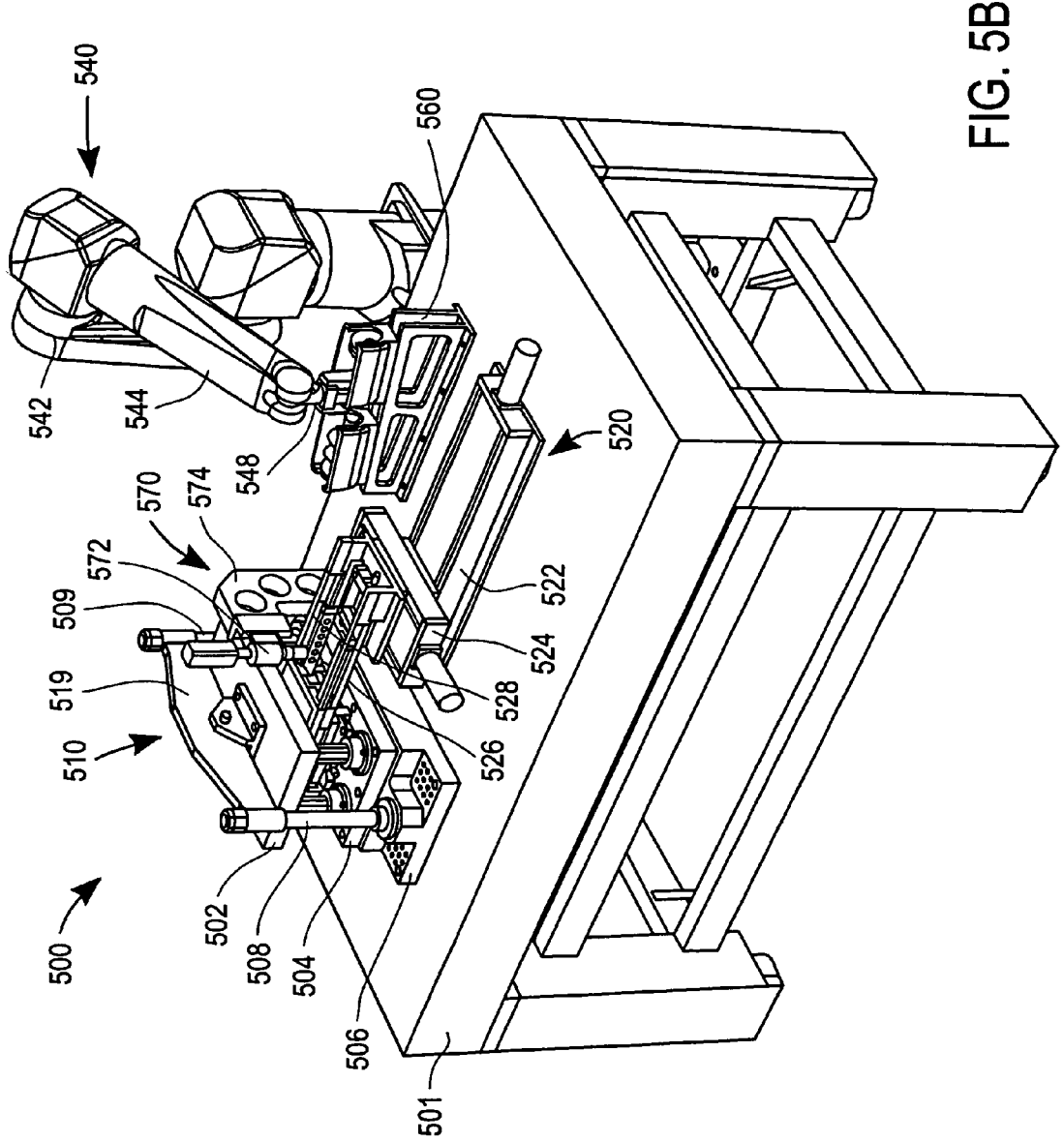

FIGS. 5A and 5B illustrate an overall assembly of an embodiment for imprinting an embossable film disposed above a disk substrate. Assembly 500 includes imprint assembly 510, infeed/outfeed assembly 520, robotic arm assembly 540, and visual assembly 570. Imprint assembly 510 and infeed/outfeed assembly 520, and visual assembly 570 are mounted to table 501. Robotic arm assembly 540 is positioned next to table 501. In one method for imprinting the embossable film disposed on disk substrates, robotic arm assembly 540 takes a disk substrate to be imprinted from cassette 560 and transports it to the infeed/outfeed assembly 520. Robotic arm assembly 540 includes link arm 542 coupled to one end of upper arm 544, and end effector 546 coupled to an opposite end of upper arm 544. Palm extension 548 is coupled to end effector 546, capable of holding a disk substrate on each side. Infeed/outfeed assembly 520 includes a disk holder plate 530 supported on a pair of cantilevered flexures 526, 528, which in turn, are mounted on a precision X-Y servo slide (i.e., first slider 522 and second slider 524). In a retracted position the infeed/outfeed assembly 520 receives a disk substrate and securely maintains its position in a disk holder plate 530. In one embodiment, the disk substrate is clamped on his edges by 3 radially disposed fingers, which are linked together and supported by a series of flexure joints (discussed in greater detail below). A single thrusting actuator repeatedly captures a disk substrate in the exact same position. Cantilevered flexures 526, 528 allow disk holder plate 530 to be urged up or down within imprint assembly 510. In addition to transporting disk holder plate 530 into and out of the imprint assembly 510, the infeed/outfeed assembly 520 can be commanded to position a disk substrate at the center of the imprinting foil dies precisely. This positional information may be obtained by inspection feedback from the visual assembly 570.

Imprint assembly 510 includes upper die assembly 502 and lower die assembly 504. The upper and lower die assemblies are disposed above press baseplate 506. Draw bars 508 and 509 couple the upper and lower die assemblies 502, 504 and extend through table 501. Imprint assembly 510 also includes embossing die foils coupled to adjustable die holders (not shown). The die holders are fixed to a high precision, rolling element bushing die set. The die set is controlled by a stout framework, which accommodates a large diameter, low-pressure, high forced sealed bladder (not shown, but disposed below table 501). Upon application of gas pressure to the bladder, it expands against a thrust plate, which causes draw bars 508, 509 to pull down on overhead yolk or cross beam 519. Cross beam 519 moves a top plate of the die set down to compress the dies together. The disk substrate may then be inspected by visual assembly 570 for proper alignment. The visual assembly 570 inspects target track features on the embossable film to determine if track features are concentric with a center hole of the disk substrate. A computer/controller or may command the final position of the servo slide to correspond with the exact center of the imprinting dies or foils when placing the disk substrate. This inspection routine may be done on a real-time or sampling basis.

Infeed/outfeed assembly 520 includes a first slider 522, a second slider 524 disposed above and perpendicular to first slider 522, flexures 526, 528 extending from second slider 524, and holder plate 530 disposed near and end portion of flexures 526, 528. In one embodiment, first and second sliders 522, 524 form a X-Y servo slide mechanism. Holder plate 530 is configured to receive a disk substrate (e.g., disk substrate 550). In one embodiment, palm extension 548 may hold to disk substrates at one time. Visual unit 570 may be positioned between imprint assembly 510 and infeed/outfeed assembly 520. Bracket 574 is mounted to table 501, with microscope 572 coupled to a top portion of bracket 574.

FIG. 5A illustrates one end of palm extension 548 positioning disk substrate 550 in holder plate 530. FIG. 5B illustrates holder plate 530 positioned between upper die assembly 502 and lower die assembly 504 of imprint assembly 510. Second slider 524 slides along rails on first slider 522 to advance holder plate 530 towards imprint assembly 510. The palm extension 548 returns to cassette 560 to retrieve additional disk substrates. Alternatively, robotic arm 540 may also be used to retrieve a disk substrate after it has been imprinted with imprint assembly 510. Visual assembly 570 may be used to check for proper alignment of the imprinting foils on the disk substrate. The proper alignment for a disk substrate may be achieved by the X-Y servo mechanism of infeed/outfeed assembly 520. In one embodiment, a vision assembly inspects a disk substrate after an embossing procedure to check for proper alignment with respect to a disk substrate center. The disk substrate is retracted from the imprint assembly and positioned to a known reference point directly below a microscope or an optical device (e.g., camera). The pattern printed on the disk is then examined. If it is found that the imprinted pattern is offset, instructions may be forwarded to the infeed/outfeed assembly to shift the holder plate to the proper position via the X-Y servo slide. This permits future disk substrates to be aligned properly with the embossing foils.

Figure 6:
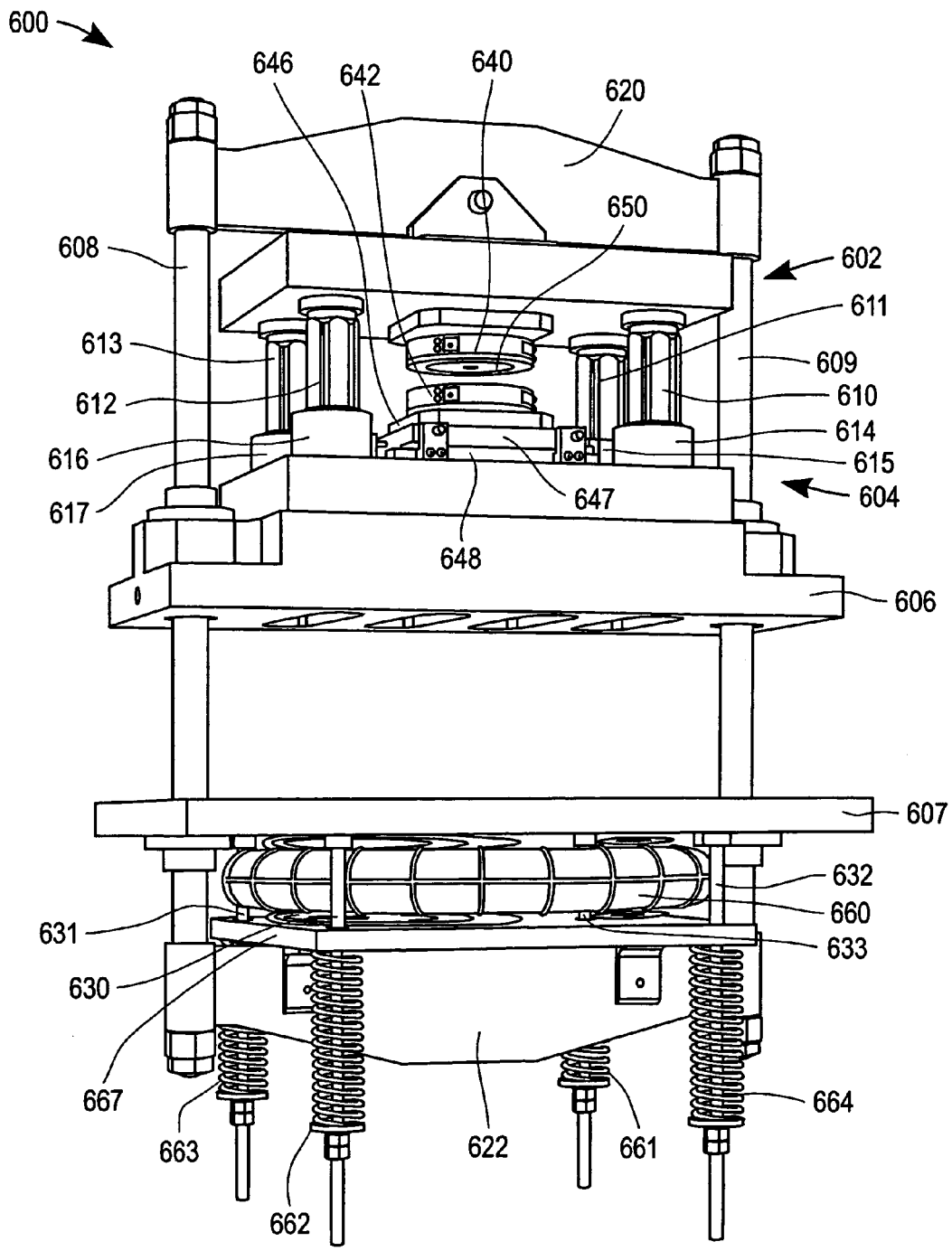
FIG. 6 illustrates one embodiment of a die assembly of an imprinting system.

FIG. 6 illustrates one embodiment of a die assembly 600. In one embodiment, die assembly 600 may be the same as the die assemblies discussed above with respect to FIGS. 2, 3, and 4. An upper portion of imprint assembly 600 includes top cross beam 620, upper die assembly 602, lower die assembly 604, and press baseplate 606. Upper die assembly 602 and lower die assembly 600 are coupled by posts 610, 611, 612, and 613. The base portion of each post has a bushing (e.g., bushings 614, 615, 616, and 617). Upper die assembly 602 also includes upper holder 640 for mounting an upper imprinting foil 650. Lower die assembly 604 includes lower holder 642 for mounting a lower imprinting foil (not shown). Lower holder 642 is disposed above lower holder base 646 float plate 647, and baseplate 648. Upper and lower die assemblies 602, 604 are disposed above press base plate 606.

A lower portion of imprint assembly 600 includes gas actuators 660 disposed between first bottom baseplate 607 and second bottom baseplate 667. Lower cross beam 622 is disposed below second bottom baseplate 667. Spring rods 631, 632, 633, and 634 allow first bottom baseplate 607 and second bottom baseplate 667 to compress gas actuator 660. In one embodiment, as gas actuator 660 expands, second bottom baseplate 667 moves downward and away from first bottom baseplate 607, with springs 661, 662, 663, and 664. This expansion causes top cross beam 620 to lower and force upper holder 640 and lower holder 642 together. The gap between press baseplate 606 and first bottom baseplate 607 would be where the upper lower portions of input assembly 600 would be mounted, for example, to table as illustrated in FIG. 2.

Figure 7:
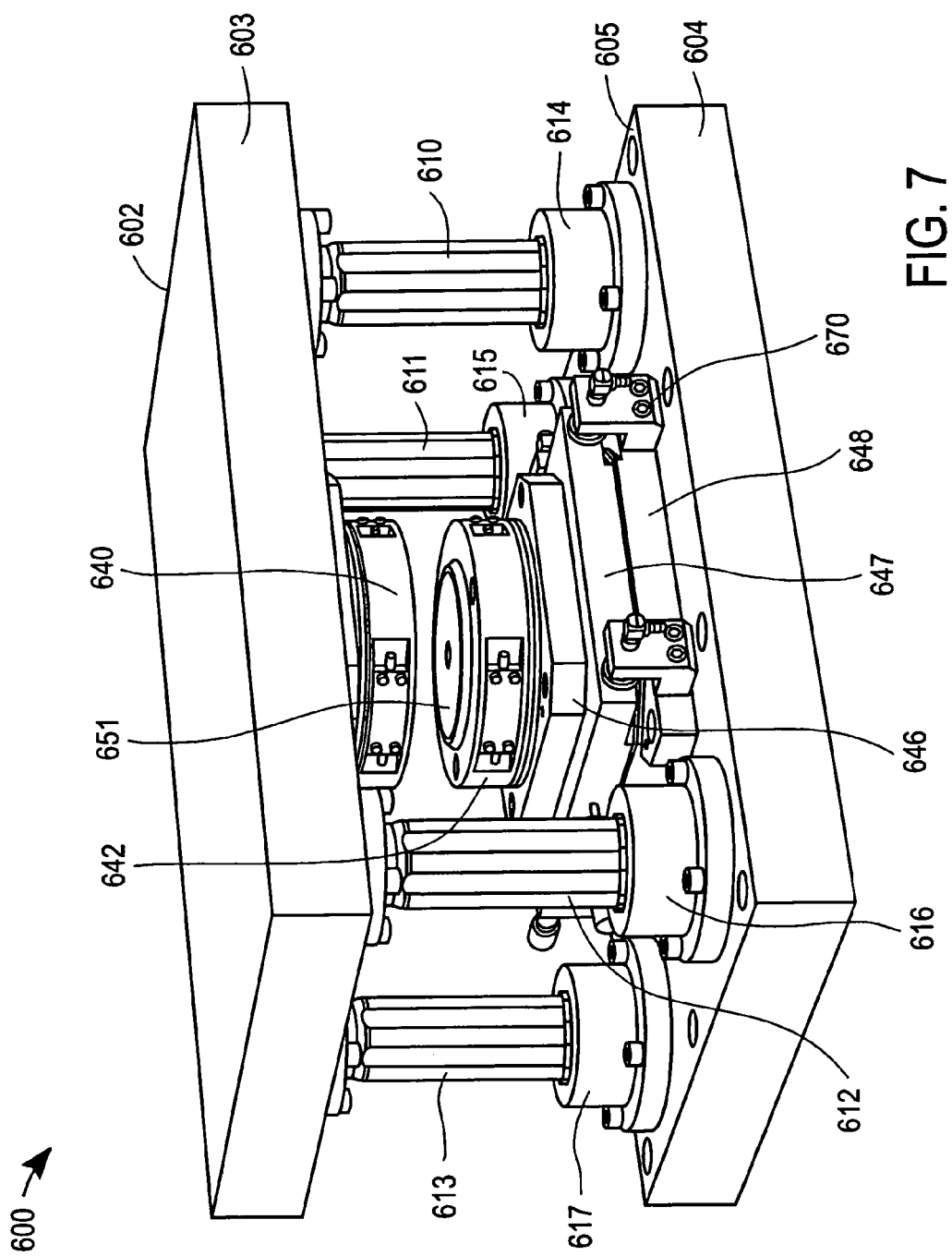
FIG. 7 illustrates another embodiment of a die assembly of an imprinting system.

FIG. 7 illustrates one embodiment of an enlarged view of the top portion of imprint assembly 600. Top support 603 of top die assembly 602 is substantially similar in size and shape with lower support 605 of lower die assembly 604. Posts 610, 611, 612, and 613 are disposed near the corners of the rectangular shaped top and lower supports. Each of the posts have a cylindrical shape having an outer diameter that is slightly less than an inner diameter of each of the bushings (e.g., 614, 615, 616, and 617) to allow upper die assembly 602 to move down towards lower die assembly 604. Upper holder 640 is coupled near a central portion of top support 603. As discussed above, lower holder 642 is disposed above base 646, float plate 647, and baseplate 648. A number of pressure nozzles (e.g., 670 secure float plate 647 to baseplate 648. Screws mounted on each of the pressure nozzles allow for adjustments of the float plate 647 with respect to the baseplate 648 to align lower holder 642 with upper holder 640 properly. This may be necessary when adjustments are made to align lower embossing foil 651 with upper imprinting foil (not shown). As such, imprint assembly 600 allows for movement of top die assembly 602 towards lower die assembly 604 with the four posts mounted near the corners of top and lower supports. Lower holder 642 may be moved or adjusted laterally to align itself with upper holder 640 properly.

Figure 7A:
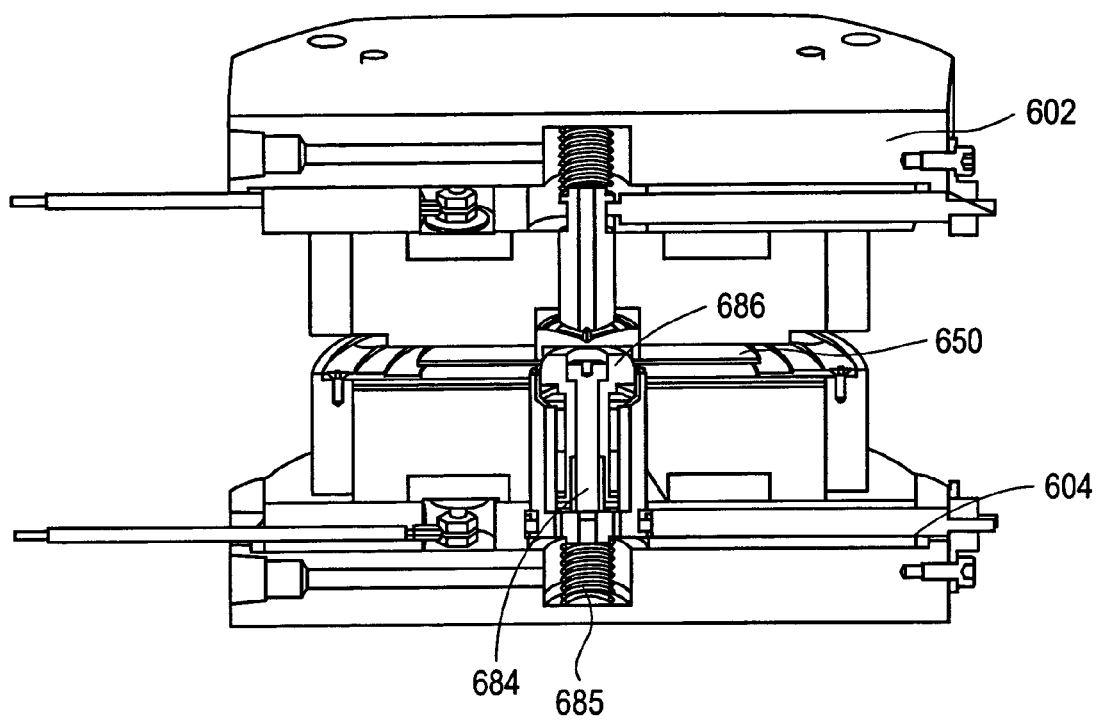
FIG. 7A illustrates a cross-sectional view of the die assembly shown in FIG. 7.
Figure 7B:
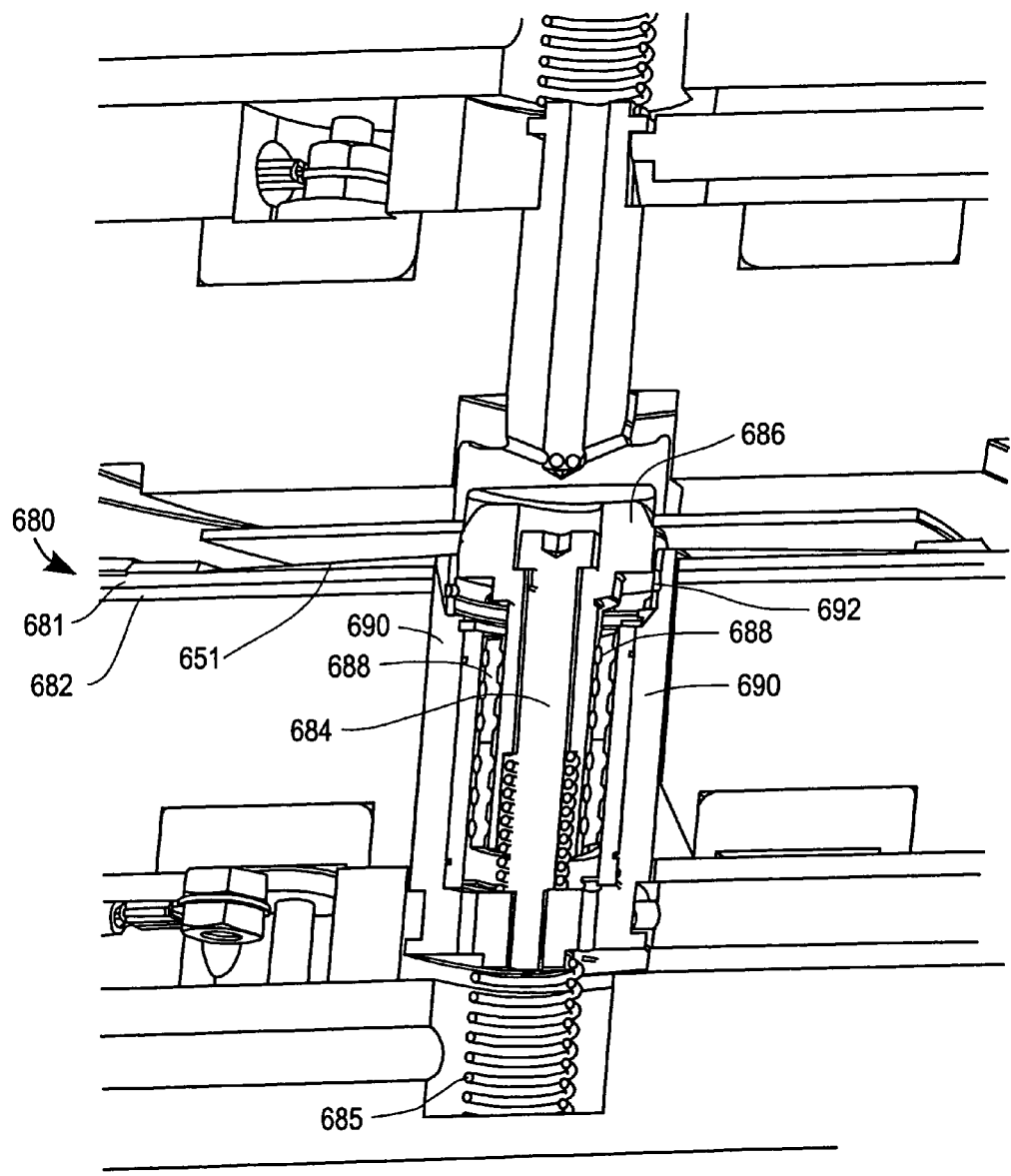
FIG. 7B illustrates an enlarged view of the cross-sectional view of the die assembly shown in FIG. 7A.

FIGS. 7A-7B illustrate cross-sectional views of one embodiment of upper die assembly 602 and lower die assembly 604. A bottom embossing foil 651 is disposed above a press pad 680 of lower die assembly 604. In one embodiment, press pad 680 may include be one or more elastomeric layers 681, 682 that allow for a uniform press of bottom foil 651 against the embossable film of disk substrate 650. A central rod 684 extends through a center portion of lower die assembly 604 and is coupled to spring 685. Central rod 684 has a tip portion 686 that is a tapered mandrel and exposed above press pad 680 and bottom foil 651. Tip portion 686 is tapered to fit inside the inner diameter (ID) of bottom foil 651 as well as disk substrate 650. A linear ball bushing 688 surrounds the elongated portion of central rod 684, and an outer sleeve 690 surrounds linear ball bushing 688. A ring portion 692 is disposed between outer sleeve 690 and tapered portion 686 of central rod 684. Ring portion 692 is also in contact with an ID of bottom foil 651. A portion of the inner diameter of bottom foil 651 extends downward and is disposed between lower mandrel 686 and outer sleeve 690.

In one embodiment, linear ball bushing 688 holds a precise alignment between central rod 684 and outer sleeve 690 to center embossing foil 651 with a centerline of central rod 684. Ball bushing 688 has a higher coefficient of thermal expansion compared to outer sleeve 620. As such, when the temperature of lower die assembly 604 is raised, ball bushing 688 expands radially to hold a firm contact with outer sleeve 690 and to hold the centering alignment of bottom foil 651 with the inner diameter of outer sleeve 690. This allows for a concentricity to be established and maintained between bottom foil 651 and disk substrate 650. Ball bushing 688 also maintains a contact with the inner diameter of bottom foil 651 through binding compressive force, which holds bottom foil 651 in place when disk substrate 650 is stripped off after imprinting. As illustrated in FIG. 7B, spring 685 lifts outer sleeve 690, which in turn lifts a portion of bottom foil 651 near the inner diameter. In effect, lifting outer sleeve 690 creates a dome-like shape for bottom foil 651 to strip disk substrate 650 cleanly off the surface of bottom foil 651.

Figure 8:
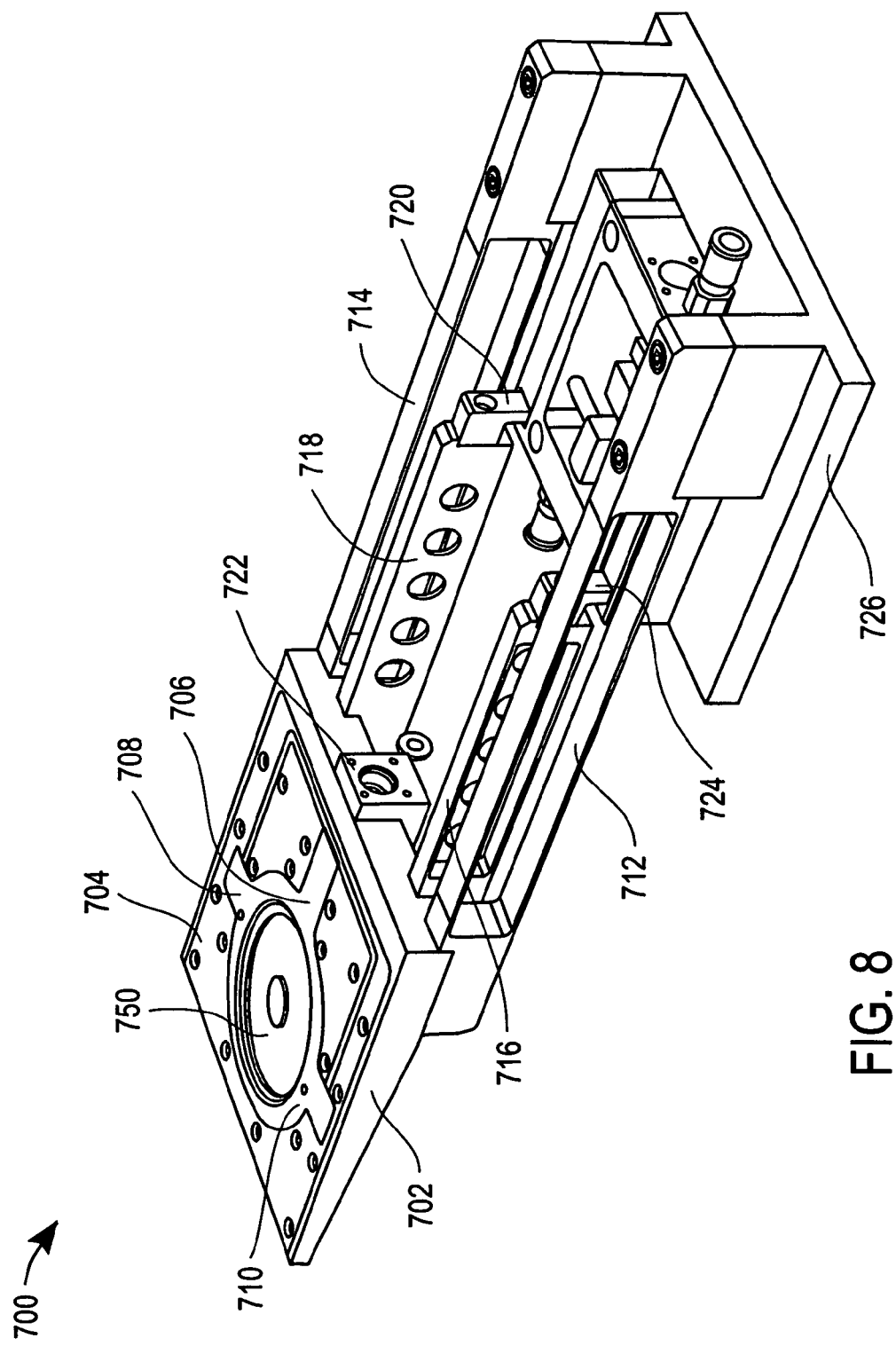
FIG. 8 illustrates an enlarged view of one embodiment of a disk transporting device.

FIG. 8 illustrates an enlarged view of a disk transporting device in the form of infeed/outfeed assembly 700 without the slider portions. A holder plate 704 is disposed on frame 702. A disk substrate 750 is secured to holder plate 704 with center finger 706, first side finger 708, and second side finger 710 radially disposed around disk substrate 750. In one embodiment, the fingers may be linked together and supported by a series of flexure joints. A pair of cantilevered flexures 712, 714, support frame 702 and are also coupled to baseplate 726. Flexures 712, 714 allow holder plate 704 to move up and down when placed within the imprint assembly (e.g., imprint assemblies 410, 510 described above with respect to FIGS. 4, 4A, 5A, and 5B). Holder plate 704 may also be supported by fixed supports 716, 718. These supports are rigid to provide stiffness and support the weight of frame 702. Top lifts 720, 724 couple fixed supports 716, 718 to base plate 726. One side of frame 702 also includes a bracket 722 that has an opening to receive a thrusting actuator to rotate the flexure joints of center finger 706, first side finger 708, and second side finger 710. As described in greater detail below, the thrusting actuator allows for a disk substrate to be captured repeatedly in the exact same position.

Figure 9A:
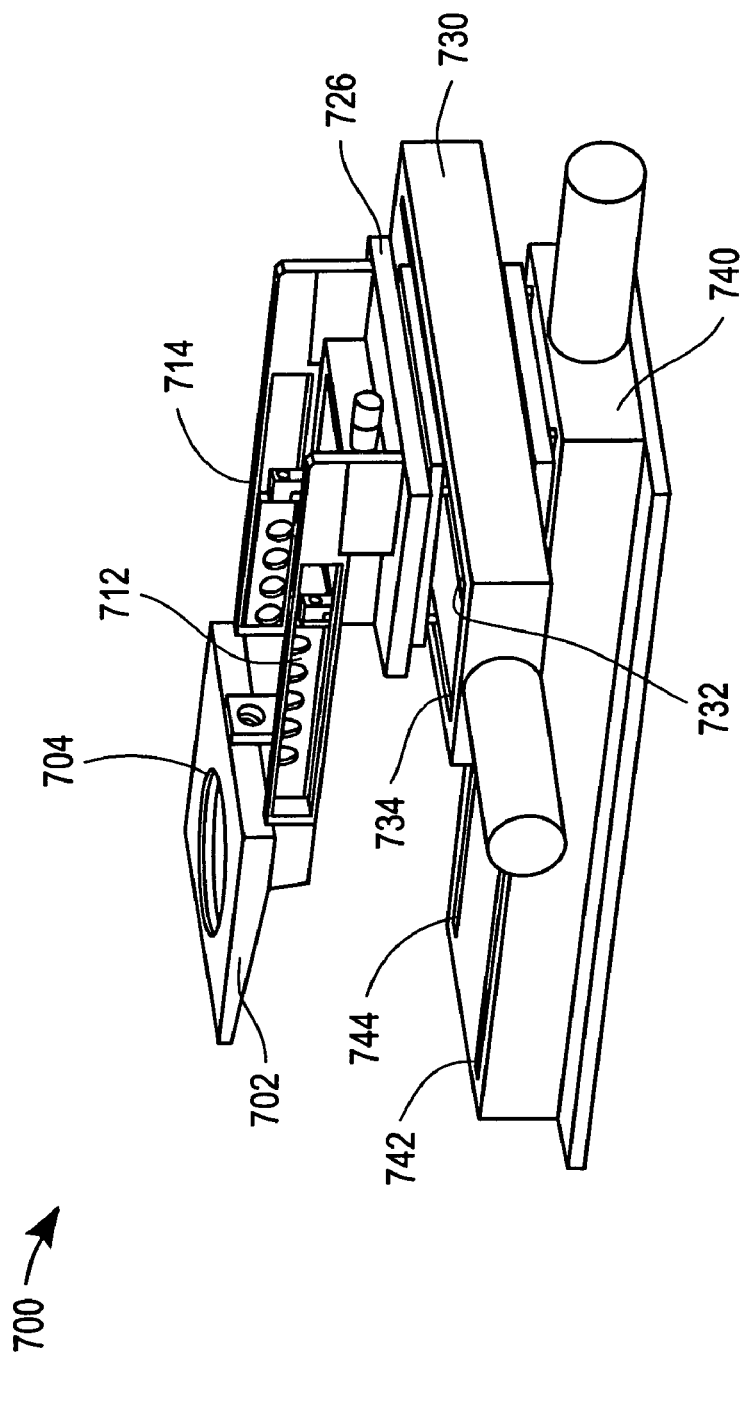
FIGS. 9A-9C illustrate one embodiment of a disk transporting device in various positions.
Figure 9B:
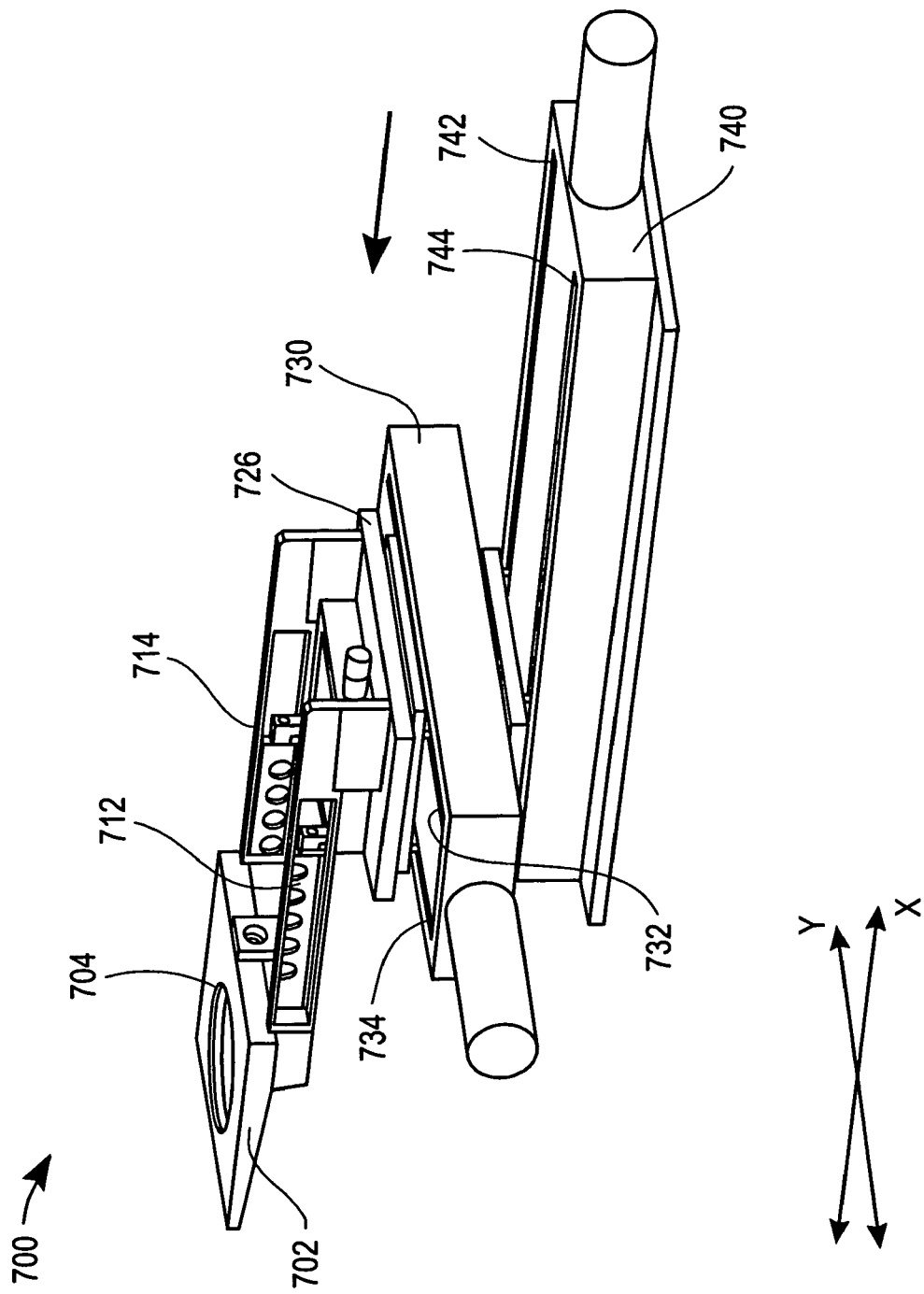
Figure 9C:
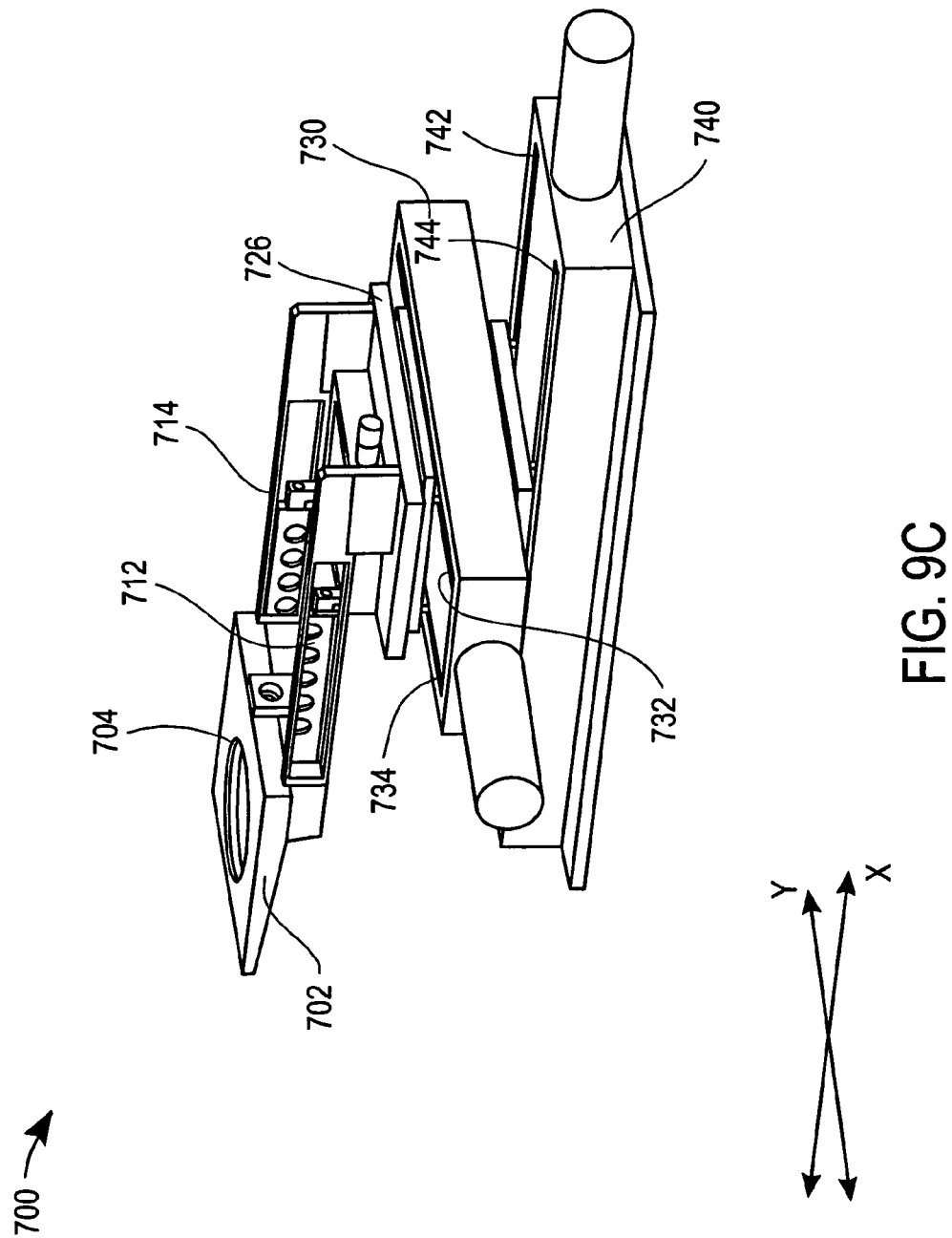

FIGS. 9A-9C illustrate infeed/outfeed assembly 700 in various slide positions including a load position as shown in FIG. 9A, an imprinting position as shown in FIG. 9B, and an inspection position as shown in FIG. 9C. Analogous to the assembly described above respect to FIGS. 4, 4A, 5A, and 5B, holder plate 704 is disposed on frame 702. A pair of cantilevered flexures 712, 714 support holder plate 704. A baseplate 726 is mounted on a X-Y servo slide that includes first slider 740 and second slider 730. Rails 732, 734 allow holder plate 704 to move along the Y-axis, and rails 742, 744 allow holder plate 704 to move along the X-axis. In one embodiment, first and second sliders 730, 740 are part of a high precision X-Y servo slide. In the load position illustrated in FIG. 9A, second slider 730 is positioned near one end of first slider 740 to retract holder plate 704. This position is similar to the position of infeed/outfeed assembly 520 illustrated in FIG. 5B, which allows a robotic arm assembly to place a disk substrate onto holder plate 704. In the load position illustrated in FIG. 9B, second slider 730 is positioned near an opposite end of first slider 740 to advance holder plate 704 into the imprint assembly. This position is similar to the position of infeed/outfeed assembly 520 illustrated in FIG. 5A, which shows the holder plate pressed between the upper and lower die assemblies. In the inspection position of FIG. 9C, second slider 730 is slightly retracted along the X-axis to position itself directly under a microscope of the vision assembly (e.g., microscope 572 of vision assembly 570 illustrated in FIG. 5A). Based on the results of the inspection, base plate 726 may be moved along the rails 732, 734 of second slider 730 (i.e., the Y-axis) to center the disk substrate with respect to the embossing foils of the imprinting assembly.

Figure 10:
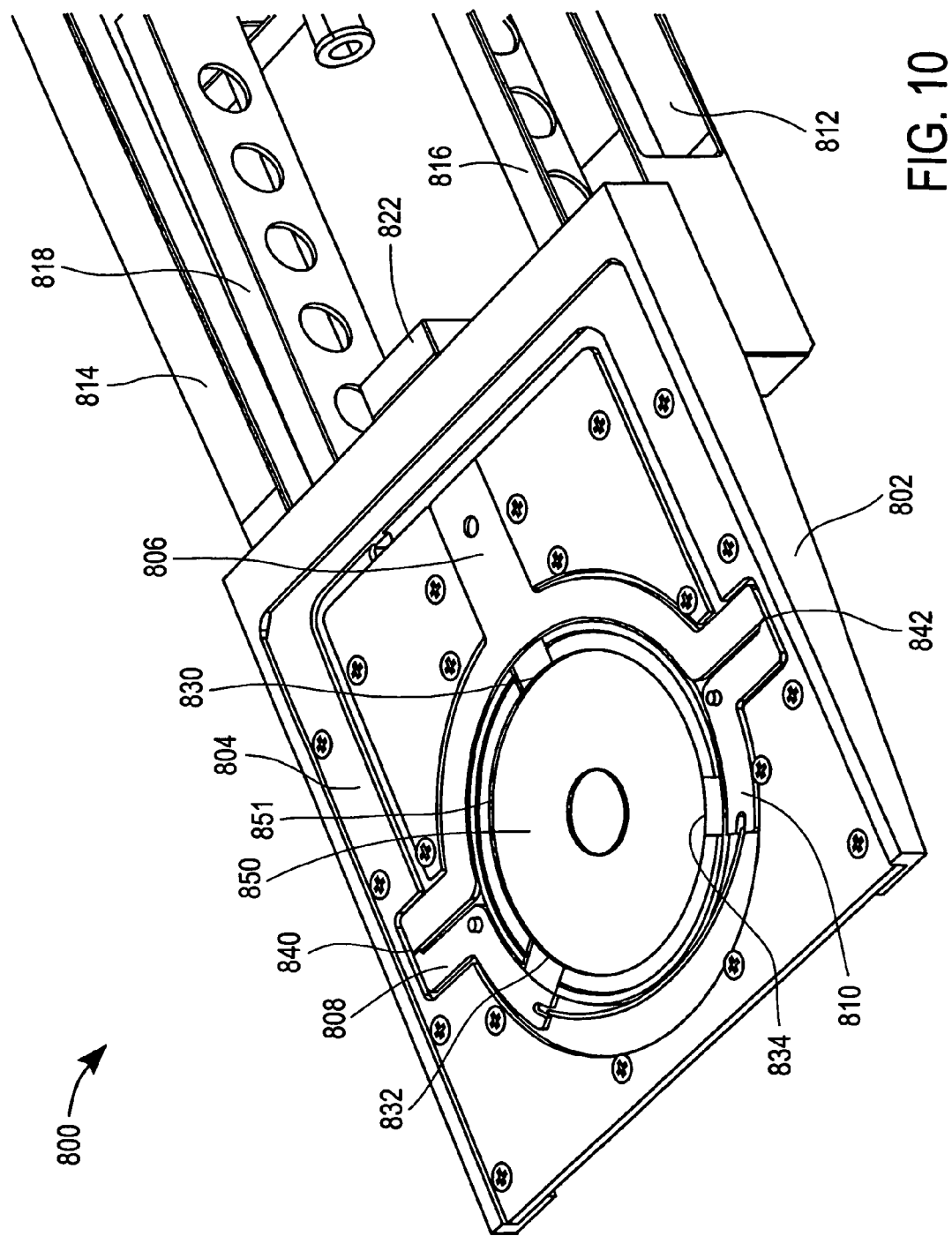
FIG. 10 illustrates an enlarged view of a portion of a disk transporting device with a disk substrate clamped onto a support tray.

FIG. 10 illustrates an enlarged view of a portion of infeed/outfeed assembly 800 in one embodiment showing a disk substrate clamped onto a support plate. Holder plate 804 is disposed on frame 802. Flexures 812, 814 and fixed supports 816, 818 are coupled to frame 802. Central finger 806, first side finger 808, and second side finger 810 are embedded within holder plate 804. Each finger has extensions 830, 832, and 834 that make contact with and clamp disk substrate 850. In one embodiment, the fingers are linked together and supported by flexure joints 840, 842. As such, a single thrusting actuator causes all the extensions (e.g., 830, 832, 834) to clamp disk substrate 850 at the same time and in the exact same position repeatedly. The thrusting actuator enters through bracket 822 and applies force first towards central finger 806. This in turn applies a force to first finger 808 and second finger 810. A single thrusting actuator provides the advantage of being able to capture a disk in the exact same position each time.

Figure 11:
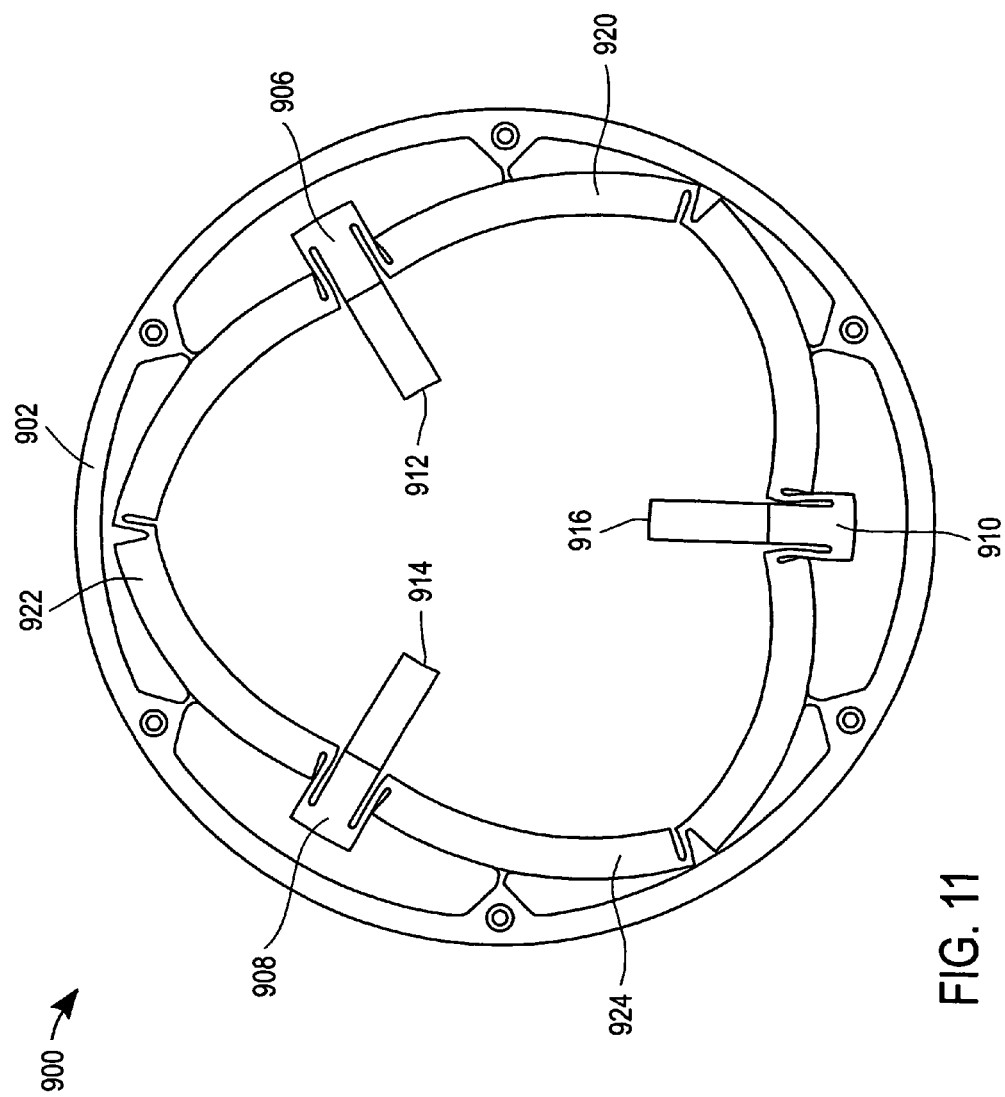
FIG. 11 illustrates an alternative embodiment of clamping or gripping structure that may be embedded within a support tray.
Figure 12:
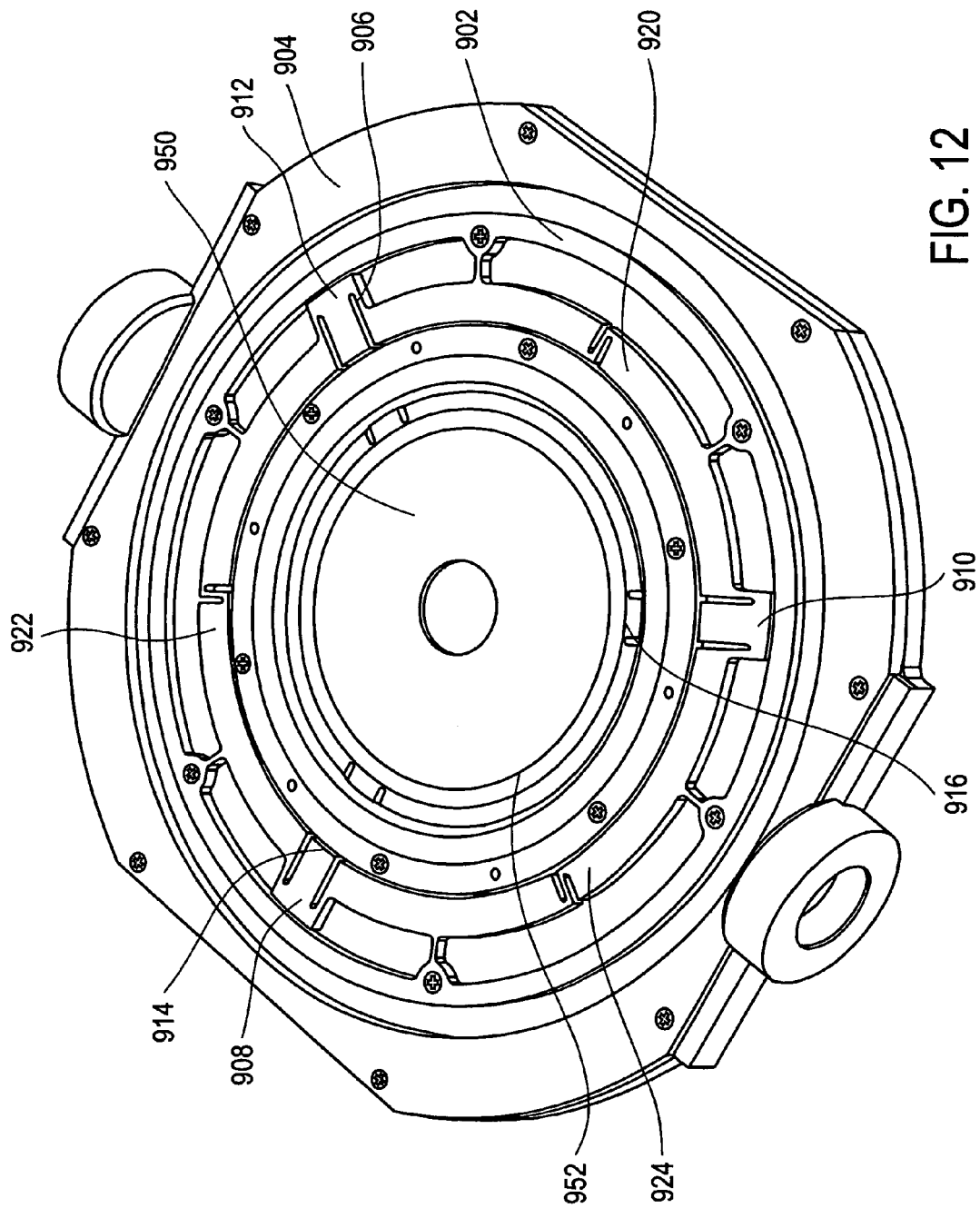
FIG. 12 illustrates one embodiment of a gripper embedded within a support tray for a clamping disk substrate.

FIG. 11 illustrates an alternative embodiment of clamping or gripping structure 900 that may be embedded within a plate holder. Gripper 900 does not require a thrusting actuator but has an outer ring that includes a series of joints 920, 922, and 924 that connect fingers 912, 914, and 916. Each of the fingers has extensions 912, 914, and 916 that are configured to make contact with an outer diameter of a disk substrate. Each of the joints are flexible to allow the fingers to expand outward or pivot to receive a disk and then compress to make contact with the disk. FIG. 12 illustrates one embodiment of gripper 900 embedded within holder plate 904 and clamping disk substrate 950. Joints 920, 922, and 924 have expanded outward to receive disk substrate 950. Extensions 912, 914, and 916 of fingers 906, 908, and 910 respectively make contact with an outer diameter 952 of disk substrate 950.

Figure 13A:
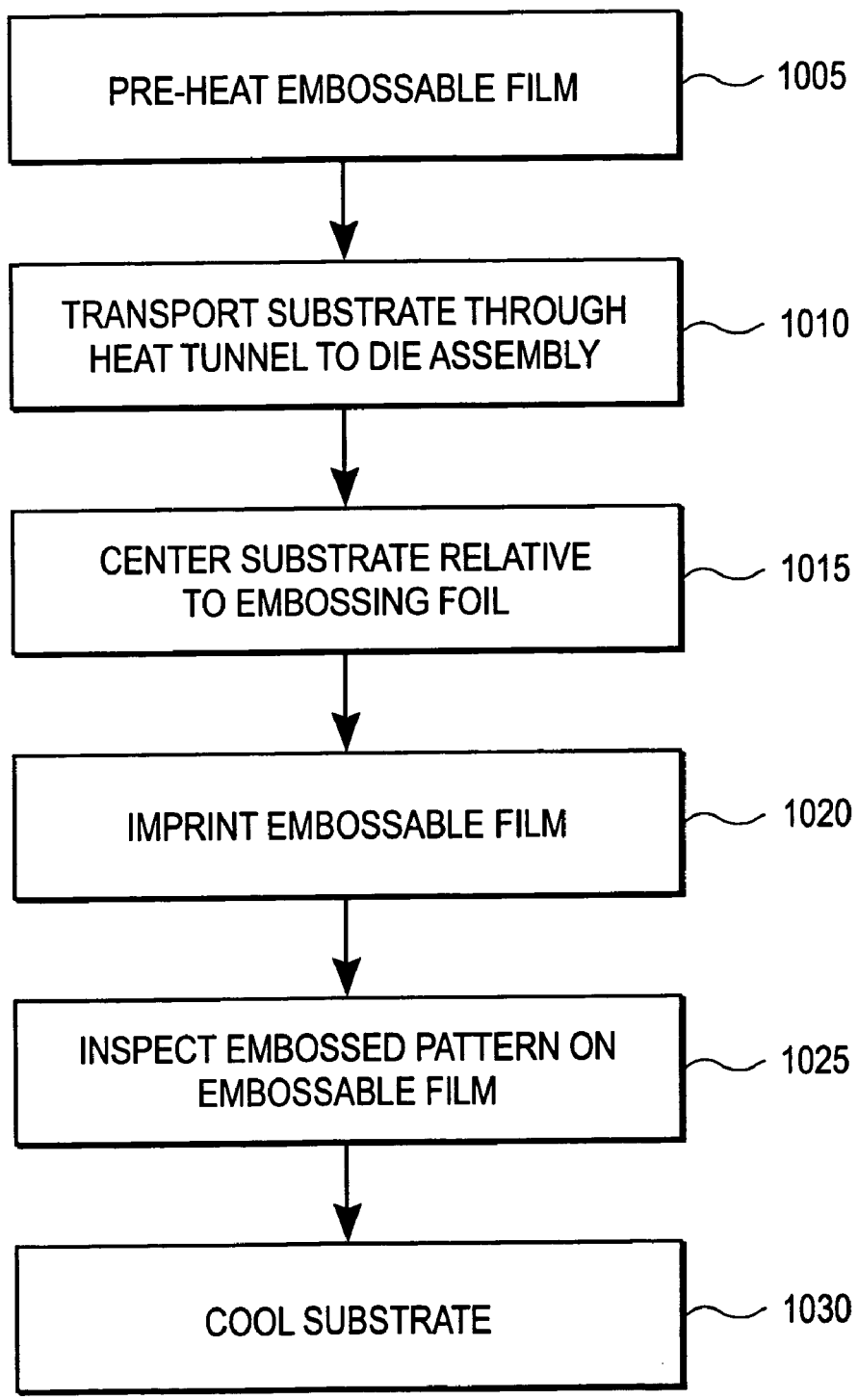
FIG. 13A is a flow chart illustrating one embodiment of a method of imprinting an embossable film disposed above a disk substrate with an imprinting system.
Figure 13B:
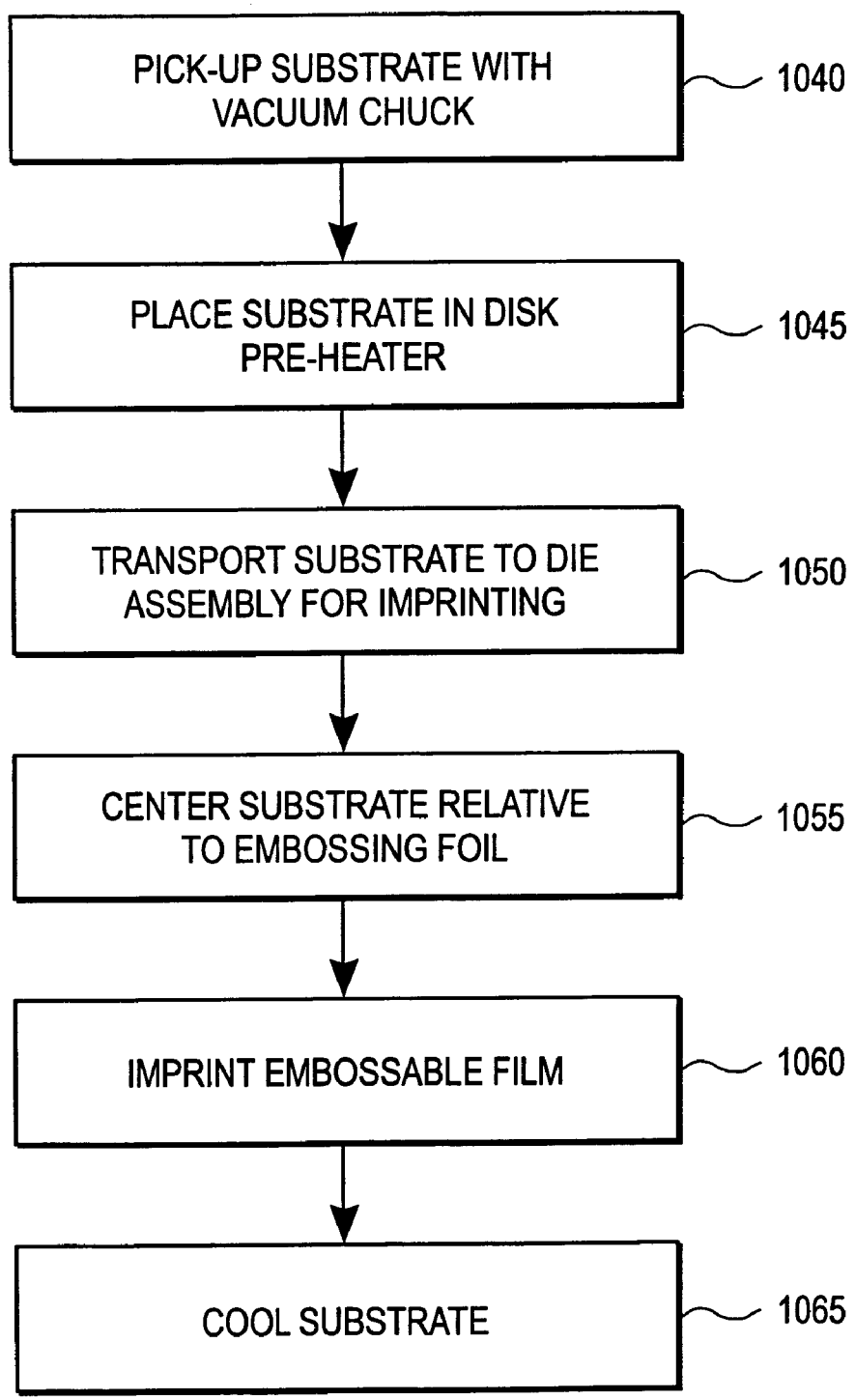
FIG. 13B is a flow chart illustrating an alternative embodiment of a method of imprinting an embossable film disposed above a disk substrate with an imprinting system.
Figure 13C:
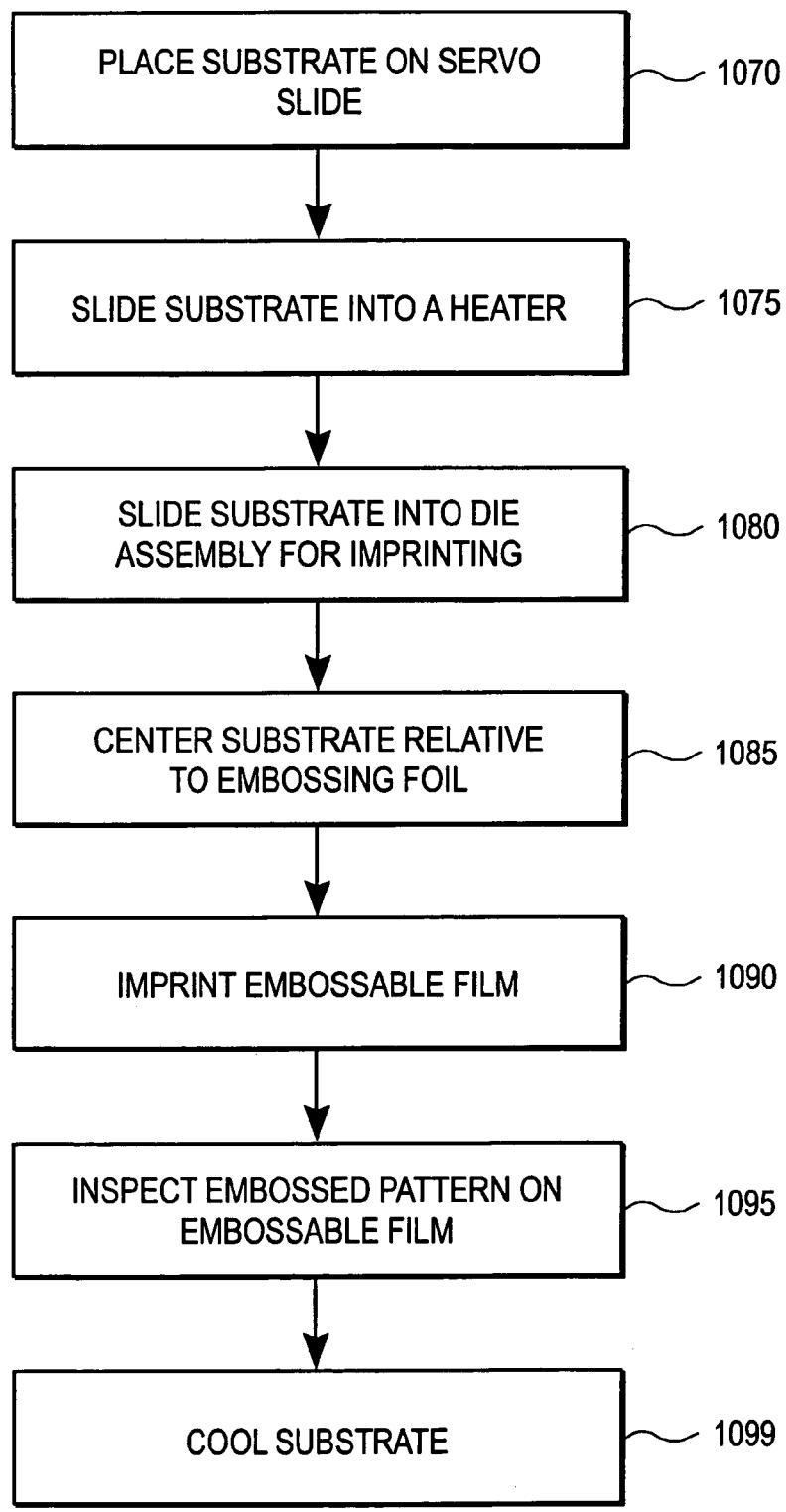
FIG. 13C is a flow chart illustrating an alternative embodiment of a method of imprinting an embossable film disposed above a disk substrate with an imprinting system.

FIGS. 13A, 13B, and 13C illustrate embodiments of a method of imprinting an embossable film disposed above a substrate. An embossable film disposed above a substrate (e.g., a disk substrate) is pre-heated, for example, to an embossing temperature, step 1005. The embossable substrate may be pre-heated in an oven (e.g., heater 330) designed to receive the substrate. In one embodiment, the substrate is then transported through a heat tunnel (e.g., heat tunnel 240) to a die assembly, step 1010. Once placed in the die assembly, the substrate is centered or aligned relative to an embossing foil (e.g., embossing foil 651) disposed within the die assembly, step 1015, followed by imprinting, step 1020. The imprint pattern on the embossable film of the substrate may then be inspected, step 1025, and then cooled, step 1030.

In an alternative embodiment illustrated in FIG. 13B, a substrate (e.g., a disk substrate) may be picked up with a pick and place device such as a vacuum chuck (e.g., 224) from a holding source, such as a cassette tray (e.g., 260), step 1040. The vacuum chuck transports the substrate to a pre-heater (e.g., 230) to raise the temperature of the embossable film to an embossing temperature, step 1045. The substrate is then removed from the heater and transported to a die assembly (e.g., 210), step 1050, and centered relative to an embossing foil disposed within the die assembly, step 1055. The embossable film of the substrate is imprinted with the pattern on the embossing foil, step 1060 and cooled, step 1065.

In an alternative embodiment illustrated in FIG. 13C, a substrate (e.g., a disk substrate) is placed on a servo slide tray (e.g., 430) that is part of the imprinting system, step 1070. The servo slide is used to position the substrate in a heater (e.g., 480), and raise the temperature of the embossable film to an embossing temperature, step 1075. The substrate is then removed from the heater and inserted into a die assembly (e.g., 410) for imprinting, step 1080, and centered relative to an embossing foil, step 1085. The embossable film of the substrate is then imprinted with the embossing pattern, step 1090, followed by an inspection of the imprinted pattern, step 1095. The substrate may then be cooled, step 1099.

Figure 14A:
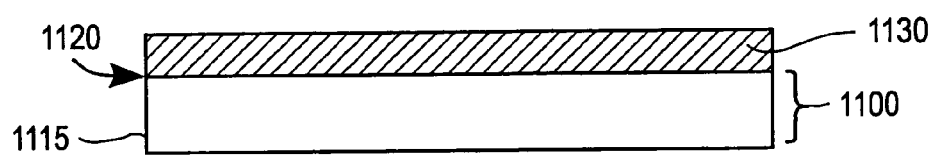
FIG. 14A is a cross sectional view illustrating one embodiment of an embossable film disposed above a disk substrate.

As previously mentioned, the apparatus and methods discussed above may be used for the imprinting of an embossable film disposed above a base structure of a disk. Referring to FIG. 14A, the base structure 1100 of a disk may be composed of a substrate 1115 and a plated NiP layer 1120. Substrate 1115 may be manufactured from, for examples, a glass or metal/metal alloy material. Glass substrates that may be used include, for example, a silica containing glass such as borosilicate glass and aluminosilicate glass. Metal alloy substrates that may be used include, for example, aluminum-magnesium (AlMg) substrates. In an alternative embodiment, other substrate materials including polymers and ceramics may be used.

NiP layer 1120 may be formed by electroplating, electroless plating, or by other methods known in the art. Plating disk substrate 1115 with a rigid or metallic material such as NiP provides mechanical support to disk substrate 1115 for e.g., subsequent polishing, and/or imprinting processes. NiP layer 1120 may be polished, planarized, and/or textured. NiP layer 1120 may be polished, for example, by a uniform etch or other polishing techniques known in the art. NiP layer 1120 may also be textured with a pattern, by various methods such as mechanical texturing using fixed or free abrasive particles (e.g., diamond). Alternatively, other types of texturing methods, such as laser texturing, may be used. Plating of disk substrate 1115 may not be necessary, however, if disk substrate 1115 is composed of a sufficiently rigid or hard material such as glass. Accordingly, substrate 1115, itself, may be polished, planarized, and/or textured using methods described above.

In an alternative embodiment, base structure 1100 may be composed of a substrate 1115 having other layers disposed thereon, for examples, a soft magnetic film. NiP layer 1120 may represent a soft magnetic film or a soft magnetic film disposed over a NiP layer. A soft magnetic film may be used to achieve the proper magnetic properties associated with perpendicular magnetic recording. The soft magnetic film may be a layer of iron-cobalt-nickel (FeCoNi) material. Other materials that may be used for the soft magnetic film include cobalt-iron (CoFe) nickel-iron (NiFe), and alloys thereof. Soft magnetic films and materials that may be used for manufacturing a soft magnetic film are well known in the art of magnetic recording disks; accordingly, a detailed discussion is not provided. The soft magnetic film may be polished and/or textured. The soft magnetic film may be textured with a pattern, by various methods such as mechanical texturing using fixed or free abrasive particles (e.g., diamond). Alternatively, other types of texturing methods, such as laser texturing, may be used to texture the soft magnetic film. In yet another embodiment, a thin NiP layer may be disposed on top of the soft magnetic film and polished and/or textured. In yet another embodiment, the soft magnetic film may be composed of one or more soft magnetic underlayers and one or more Ru interlayers disposed between soft magnetic underlayers.

Embossable film 1130 is disposed on the base structure 1100 in order to form an imprintable (i.e., embossable) film. Various embossable materials may be used to form the embossable film 1130. In one embodiment, for example, poly (methyl methacrylate) (PMMA) or a co-polymer—poly(methyl methacrylate methacrylic acid copolymer) (P(MMA-MAA) may be used for embossable film 1130. Alternatively, other embossable materials may be used for example, PMMA and a thermo-set polymer such as MR-I 9000 available from Micro Resists Technology of Germany. Alternatively, embossable film 1130 may be composed of multiple embossable films. The embossable materials may be spin coated on base structure 1100 to produce the embossable film 1130. Other coating methods such as dip coating, dip-spin coating, spray coating, sputtering and vacuum deposition (e.g., CVD) may be used.

FIGS. 14A, 14B, 15A, 15B and 15C illustrate alternative embodiments of a method of imprinting an embossable film such as an embossable film disposed above a base structure. In one embodiment, the base structure may be a substrate or a disk substrate. Embossable film 1130 is disposed over base structure 1100, step 1210. In one embodiment, embossable film 1130/base structure 1100 and stamper 1190 are heated at or above the "glass transition temperature" (Tg) of embossable film 1130, step 1230. The glass transition temperature is a term of art that refers to the temperature where a polymer material becomes viscoelastic above this temperature (which is different for each polymer).

Figure 14B:
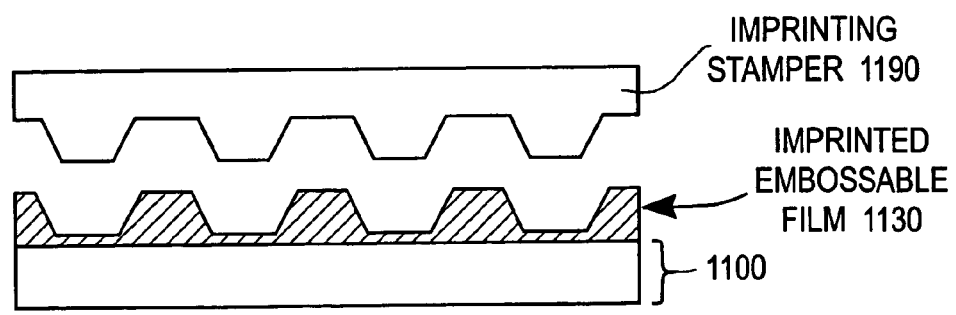
FIG. 14B is a cross sectional view illustrating one embodiment of the imprinting of an embossable film by an imprinting stamper.

Stamper 1190 is then pressed into the embossable film 1130, step 1235. In one embodiment, stamper 1190 is separated from embossable film 1130, step 1240, and then cooled after separation, step 1243. An imprinted pattern of trenches areas (a.k.a., recessed areas, grooves, valleys, etc.) and plateaus (a.k.a., raised areas) is thereby formed in the embossable film 1130 (as illustrated in FIG. 14B). The separation of stamper 1190 from embossable film 1130 before cooling may facilitate the separation process and result in less damage to the imprinted pattern in embossable film 1130.

Figure 15A:
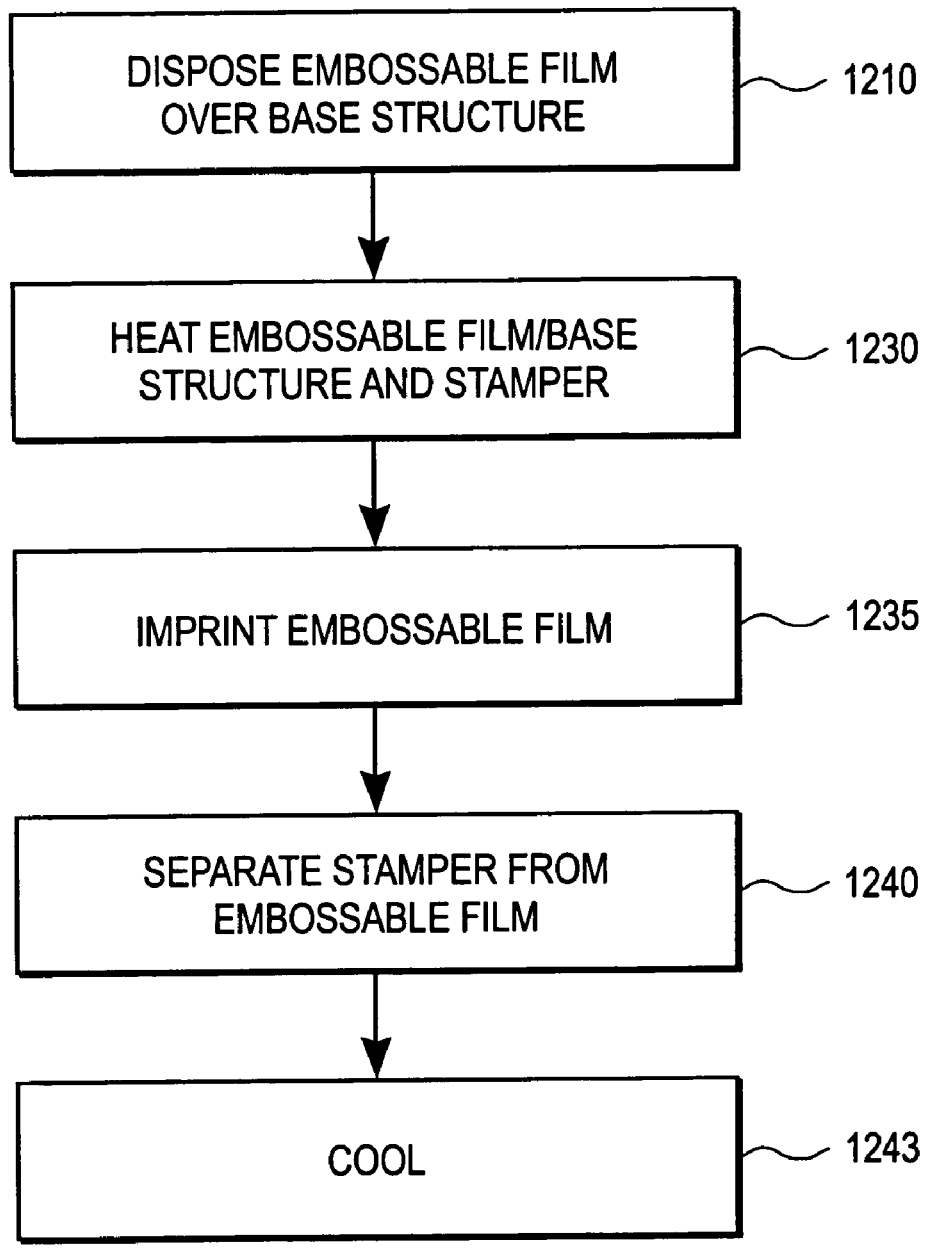
FIG. 15A is a flow chart illustrating one embodiment of a method of imprinting an embossable film.
Figure 15B:
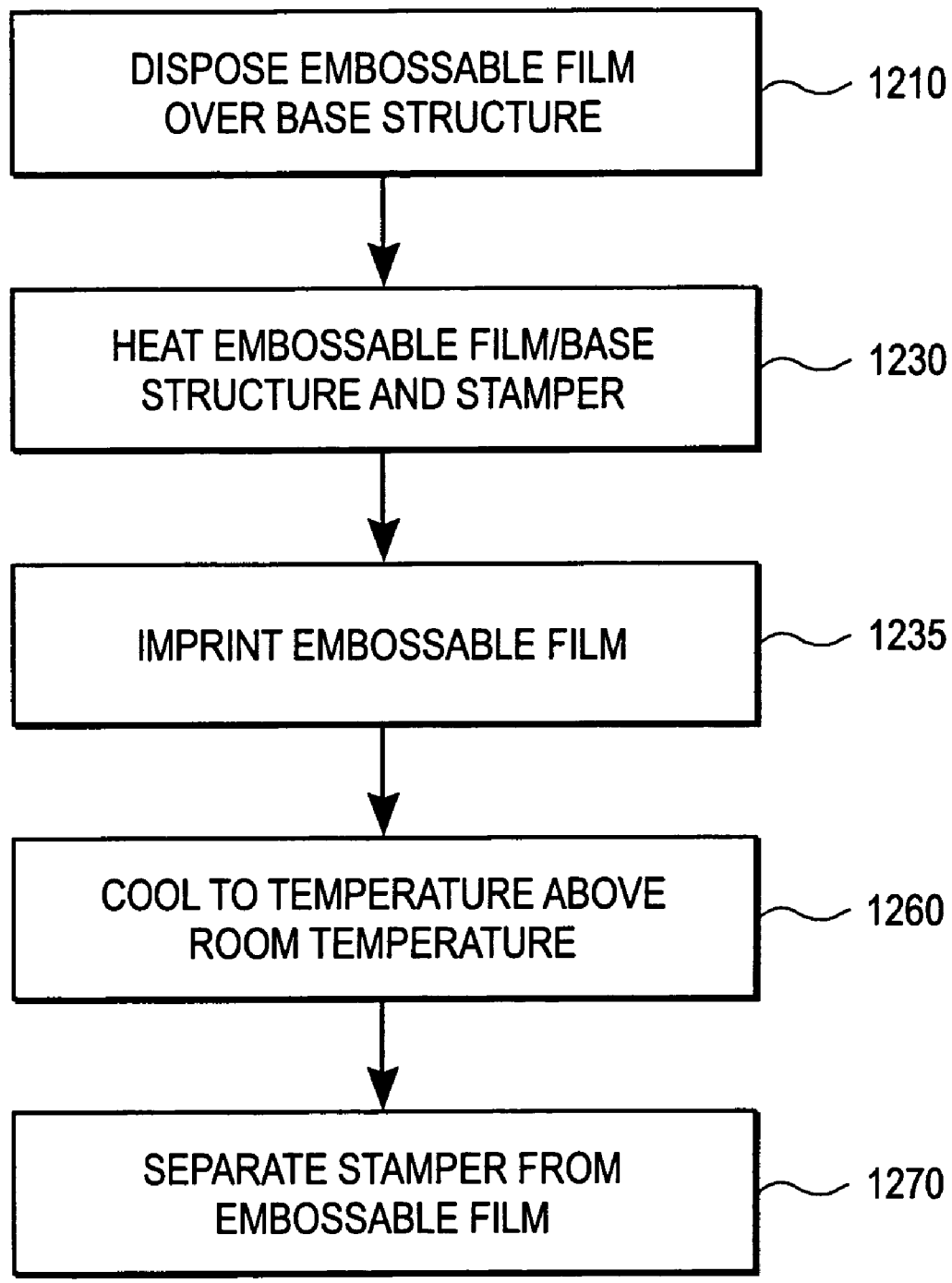
FIG. 15B is a flow chart illustrating an alternative embodiment of a method of imprinting an embossable film.

In an alternative embodiment illustrated in FIG. 15B, the system may be cooled to a temperature above room temperature, step 1260, prior to the separation of stamper 1190 from embossable film 1130, step 1270. For example, where the embossable film 1130 is heated above its transition temperature, the coupled stamper 1190/embossable film 1130 may be cooled to a lower temperature down to approximately the glass transition temperature of the embossable film 1130 prior to separation. Alternatively, for another example, the coupled stamper 1190/embossable film 1130 may be cooled to a temperature in the range of approximately at the transition temperature of the embossable film 1130 to just above room temperature. In yet another embodiment, the coupled stamper 1190/embossable film 1130 may be cooled to room temperature and then separated.

Figure 15C:
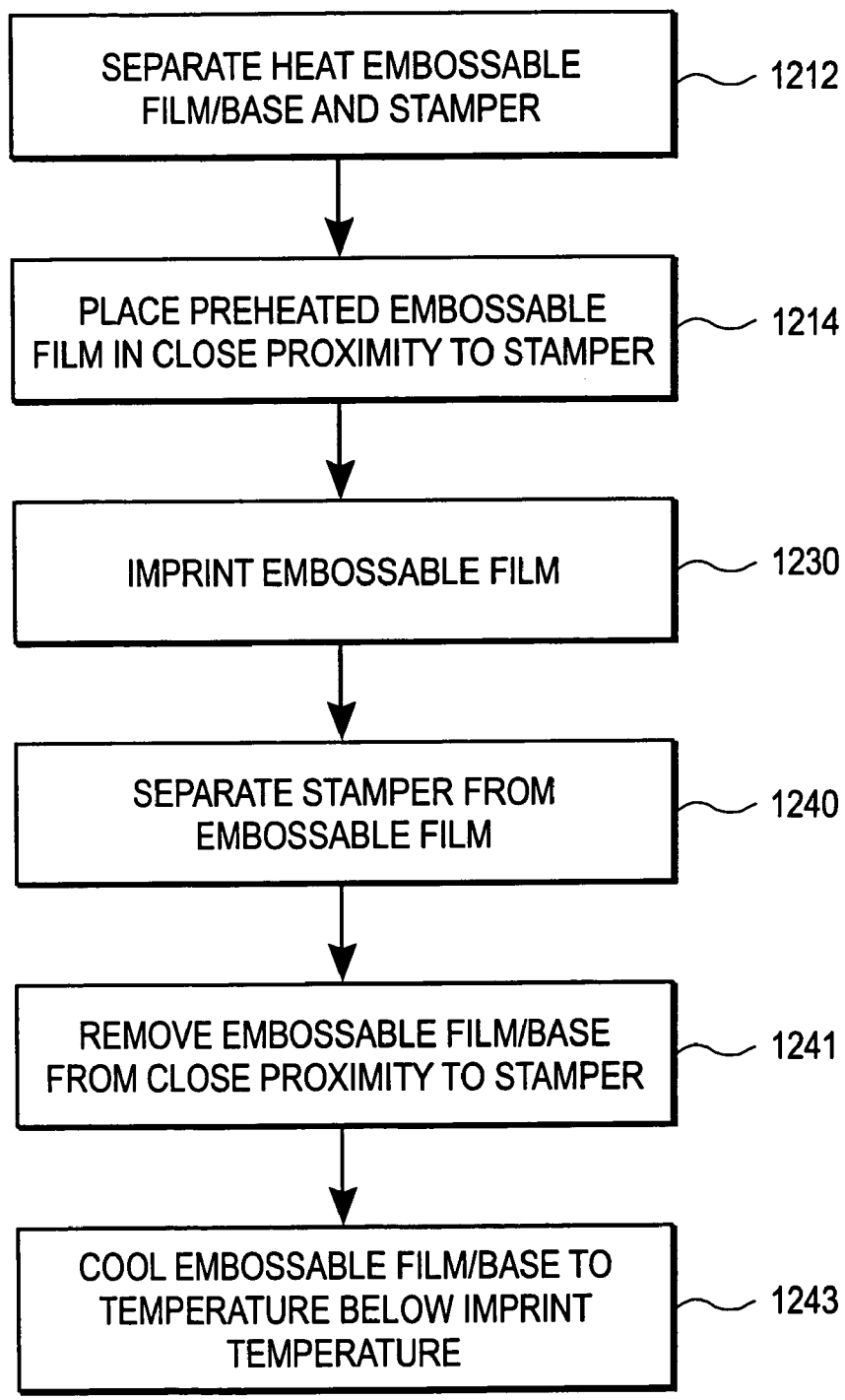
FIG. 15C is a flow chart illustrating another embodiment of a method of imprinting an embossable film.

FIG. 15C illustrates an alternative embodiment of imprinting an embossable film including preheating the embossable film prior to imprinting. In this embodiment, embossable film 1130 and stamper 1190 may be separately heated. In step 1212, after disposing embossable film 1130 over the base structure, this structure may be preheated to the embossing temperature prior its introduction into die assembly 210 by, for example, heater 230 of FIG. 2. In step 1214, the preheated embossable film 1130/base structure 1100 is positioned in close proximity (e.g., nest area of lower die assembly 214) to the stamper 1190. Alternatively, the embossable film 1130/base structure 1100 may be preheated to a temperature below that of (e.g., close to) the embossing temperature and then heated to the embossing temperature during or after its positioning in the nest area of lower die assembly 214. Alternatively, the embossable film 1130/base structure 1115 may be preheated to the stamper's temperature/embossing temperature and imprinted after its close positioning to stamper 1190. Stamper 1190 is then pressed into the embossable film 1130 at the embossing temperature, step 1230. The stamper 1190 is then separated from embossable film 1130 after imprinting, step 1240. In one embodiment, the embossable film 1130/base structure 1100 may be removed from close proximity to stamper 1190, step 1241, and then cooled to a temperature below the glass transition temperature of embossable film 1130. The stamper 1190 is then separated from embossable film 1130 after imprinting. In one embodiment, the embossable film 1130/base structure 1100 may be removed from close proximity to stamper 1190 and then cooled to a temperature below the glass transition temperature of embossable film 1130, step 1243.

An imprinted pattern of trenches areas (a.k.a., recessed areas, grooves, valleys, etc.) and plateaus (a.k.a., raised areas) is thereby formed in the embossable film 1130 (as illustrated in FIG. 14B). Following the imprinting of a pattern into embossable film 1130, a subtractive or an additive process may be used to form the desired DTR pattern in the disk. In a subtractive process, for example, one or more layers disposed above the substrate 1115 may be removed (e.g., through imprint lithography and etching) to expose a desired pattern on layer 1120 (e.g., a NiP or soft magnetic layer). Alternatively, the DTR pattern may be formed in substrate 1115. In an additive process where layer 1120 is, for example, a NiP layer, a material compatible or identical to material forming the initial NiP layer is added or plated to form the raised areas of the discrete track recording pattern.

In one embodiment, the imprinting of an embossable film 1130 may be performed at approximately room temperature using an embossable material that does not have a glass transition temperature (Tg), for examples, thermosetting (e.g., epoxies, phenolics, polysiloxanes, ormosils, silica-gel) and radiation curable (e.g., UV curable, electron-beam curable) polymers. Silica-gel may be obtained from industry manufacturers, for example, SOL-GEL available from General Electric Corp., of Waterford N.Y. In another embodiment, a thermo plastic material, for example, a polymer such as Ultem available from General Electric Corp., of Waterford N.Y. may be used for the embossable film. In such an embodiment, for example, the use of a disk heater (e.g., heater assembly 230) may not be necessary since an elevated temperature of a substrate need not be maintained during transport to stamper 1190.

As previously noted, the apparatus and methods discussed herein may be used with various types of base structures (e.g., optical disk substrates and wafer substrates, panel substrates) having embossable films. For example, the imprinting system discussed herein may be used in the production of optical recording disks, semiconductor wafers, liquid crystal display panels, etc. In one embodiment, the apparatus and methods discussed herein may be used with various types of base structures (e.g., wafer and panel oxide/substrates) having an embossable layer disposed thereon. In an alternative embodiment, for example, the imprinting apparatus and methods discussed herein may be used to fabricate semiconductor devices such as, for example, a transistor. In such a fabrication, an embossable layer may be disposed above a base structure of, for example, an oxide (e.g., $SiO_2$) layer on top of a silicon wafer substrate. A stamper may be generated with a patterned structure for active areas of the transistor. The stamper is imprinted into the embossable layer with the embossed pattern transferred into the oxide layer using etching techniques (e.g., reactive ion etching). Subsequent semiconductor wafer fabrication techniques well known in the art are used to produce the transistor.

In an alternative embodiment, for example, the imprinting apparatus and methods discussed herein may be used to fabricate pixel arrays for flat panel displays. In such a fabrication, an embossable layer may be disposed above a base structure of, for example, an indium tin oxide (ITO) layer on top of a substrate. The stamper is generated with a patterned layer being an inverse of the pixel array pattern. The stamper is imprinted into the embossable layer with the embossed pattern transferred into the ITO using etching techniques to pattern the ITO layer. As a result, each pixel of the array is separated by an absence of ITO material (removed by the etching) on the otherwise continuous ITO anode. Subsequent fabrication techniques well known in the art are used to produce the pixel array.

In yet another embodiment, as another example, the imprinting apparatus and methods discussed herein may be used to fabricate lasers. In such a fabrication, embossable material areas patterned by the stamper are used as a mask to define laser cavities for light emitting materials. Subsequent fabrication techniques well known in the art are used to produce the laser. In yet other embodiments, the apparatus and methods discussed herein may be used in other applications, for example, the production of multiple layer electronic packaging, the production of optical communication devices, and contact/transfer printing.

In the foregoing specification, the invention has been described with reference to specific exemplary embodiments thereof. It will, however, be evident that various modifications and changes may be made thereto without departing from the broader spirit and scope of the invention as set forth in the appended claims. For example, although certain figures and methods herein are discussed with respect to single-sided imprinting, they may be used for double-sided imprinting as well. The specification and figures are, accordingly, to be regarded in an illustrative rather than a restrictive sense.

What is claimed is:

1. An apparatus for imprinting an embossable film disposed above a substrate, comprising:
   a die having a bottom surface;
   an embossing foil disposed above the bottom surface;
   a mandrel having a rod portion that extends through a central portion of the die, the mandrel to receive the substrate;
   a ball bushing disposed around the rod portion;
   an outer sleeve disposed around the rod portion and in contact with the embossing foil, wherein the outer sleeve has a different coefficient of thermal expansion than that of the ball bushing; and
   a ring portion of the die disposed between the ball bushing and the embossing foil to hold a precise alignment of a centerline of the rod portion and a centerline of the embossing foil.

2. The apparatus of claim 1, wherein the mandrel is tapered to receive the substrate having a hole defined by an inner dimensional edge of the substrate.

3. The apparatus of claim 1, wherein the outer sleeve disposed around the rod portion has a lower coefficient of thermal expansion than that of the ball bushing.

4. The apparatus of claim 1, wherein a thermal expansion of the ball bushing secures the ring portion to an inner dimension of the embossing foil to center the substrate with the embossing foil.

5. The apparatus of claim 1, wherein the outer sleeve lifts a center portion of the embossing foil to separate the substrate from the embossing foil.

6. The apparatus of claim 1, wherein the bottom surface comprises an elastomeric pad.

7. An apparatus for imprinting an embossable film disposed above a substrate, comprising:
   a die having a bottom surface;
   an embossing foil disposed above the bottom surface;
   a mandrel having a rod portion that extends through a central portion of the die, the mandrel to receive the substrate;
   a ball bushing disposed around the rod portion;
   a ring portion of the die disposed between the ball bushing and the embossing foil to hold a precise alignment of a centerline of the rod portion and a centerline of the embossing foil, wherein a thermal expansion of the ball bushing secures the ring portion to an inner dimension of the embossing foil to center the substrate with the embossing foil; and
   an outer sleeve disposed around the rod portion and in contact with the embossing foil, wherein the outer sleeve lifts a center portion of the embossing foil to separate the substrate from the embossing foil.

8. An apparatus for imprinting an embossable film disposed above a substrate, comprising:
   a die having a bottom surface;
   an embossing foil disposed above the bottom surface;
   a mandrel having a rod portion that extends through a central portion of the die, the mandrel to receive the substrate;
   a ball bushing disposed around the rod portion; an outer sleeve disposed around the rod portion and in contact with the embossing foil; and
   a ring portion of the die disposed between the ball bushing and the embossing foil to hold a precise alignment of a centerline of the rod portion and a centerline of the embossing foil, wherein the outer sleeve is configured to lift a center portion of the embossing foil to separate the substrate from the embossing foil.

9. The apparatus of claim 8, wherein the mandrel is tapered to receive the substrate having a hole defined by an inner dimensional edge of the substrate.

10. The apparatus of claim 8, wherein a thermal expansion of the ball bushing secures the ring portion to an inner dimension of the embossing foil to center the substrate with the embossing foil.

11. The apparatus of claim 8, wherein the bottom surface comprises an elastomeric pad.

* * * * *